(12) United States Patent
He et al.

(10) Patent No.: US 12,127,160 B2
(45) Date of Patent: Oct. 22, 2024

(54) COMMUNICATION METHOD AND APPARATUS

(71) Applicant: Huawei Technologies Co., Ltd., Shenzhen (CN)

(72) Inventors: Qingchun He, Beijing (CN); Xiangdong Zhang, Shenzhen (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 586 days.

(21) Appl. No.: 17/351,752

(22) Filed: Jun. 18, 2021

(65) Prior Publication Data

US 2021/0314912 A1  Oct. 7, 2021

Related U.S. Application Data

(63) Continuation of application No. PCT/CN2019/123400, filed on Dec. 5, 2019.

(30) Foreign Application Priority Data

Dec. 21, 2018  (CN) .......................... 201811573682.X

(51) Int. Cl.
*H04W 72/12* (2023.01)
*H04W 68/00* (2009.01)
(Continued)

(52) U.S. Cl.
CPC ..... *H04W 68/005* (2013.01); *H04W 72/1263* (2013.01); *H04W 76/11* (2018.02); *H04W 76/27* (2018.02)

(58) Field of Classification Search
CPC ........... H04W 68/005; H04W 72/1263; H04W 76/11; H04W 76/27; H04W 52/0219;
(Continued)

(56) References Cited

U.S. PATENT DOCUMENTS 10,560,928 B2 *  2/2020  Takeda ................. H04W 48/10
2006/0029011 A1   2/2006  Etemad et al.
(Continued)

FOREIGN PATENT DOCUMENTS

| CN | 107018497 A | 8/2017 |
|---|---|---|
| CN | 108024221 A | 5/2018 |
| CN | 108966322 A | 12/2018 |

OTHER PUBLICATIONS

Ericsson, "Indication of CN initiated or RAN initiated paging", 3GPP TSG-RAN WG2 #101, Tdoc R2-1802341, 26 (Year: 2018).*
(Continued)

*Primary Examiner* — Lan-Huong Truong
(74) *Attorney, Agent, or Firm* — Slater Matsil, LLP

(57) ABSTRACT

A communication method and apparatus are provided. The method may be applied to a terminal and a network device. In the method, the network device first sends first indication information before sending a paging message, where the first indication information is used to indicate whether at least two terminals in an RRC_IDLE state or an RRC_INACTIVE state need to receive the paging message. In this way, after each of the at least two terminals receives the first indication information, the terminal may determine, based on the first indication information, whether the terminal needs to receive the paging message. If determining that the terminal needs to receive the paging message, the terminal may detect and receive the paging message on a corresponding time-frequency resource after the network device sends the paging message.

20 Claims, 11 Drawing Sheets

(51) Int. Cl.
*H04W 72/1263* (2023.01)
*H04W 76/11* (2018.01)
*H04W 76/27* (2018.01)

(58) Field of Classification Search
CPC .......... H04W 68/025; H04W 52/0216; H04W 68/02; H04W 52/0209; Y02D 30/70
See application file for complete search history.

(56) References Cited

U.S. PATENT DOCUMENTS

| | | | |
|---|---|---|---|
| 2018/0234941 A1* | 8/2018 | Kim | H04W 76/19 |
| 2019/0313364 A1* | 10/2019 | Liang | H04W 68/02 |
| 2020/0205076 A1 | 6/2020 | Chen et al. | |
| 2020/0337002 A1* | 10/2020 | Ko | H04L 5/0016 |
| 2020/0404617 A1* | 12/2020 | Murray | H04W 68/02 |
| 2021/0022202 A1* | 1/2021 | Kim | H04W 76/27 |

OTHER PUBLICATIONS

Nokia, Alcatel-Lucent Shanghai Bell, "Paging in NR at HF operation", 3GPP TSG-RAN WG2 NR Adhoc, R2-1700062, Jan. 17-19, 2017, 6 pages, Spokane, USA (Year: 2017).*

Vivo, Remaining FFS issues on MSG3/4/5 content for NR RRC connection control, 3GPP TSG RAN WG2 Meeting #101bis, R2-1804598, Sanya, China, Apr. 6, 2018 (Year: 2018).*

Ericsson, "Indication of CN initiated or RAN initiated paging", 3GPP TSG-RAN WG2 #101, Tdoc R2-1802341, Feb. 26-Mar. 2, 2018, 3 pages, Athens, Greece (Year: 2018).*

Nokia, Alcatel-Lucent Shanghai Bell, "Paging in NR at HF operation", 3GPP TSG-RAN WG2 NR Adhoc, R2-1700062, Jan. 17-19, 2017, 6 pages, Spokane, USA.

Lenovo, Motorola Mobility, "RAN paging in the inactive state", 3GPP TSG-RAN WG2 Meeting#101, R2-1802311, Feb. 26-Mar. 2, 2018, 4 pages, Athens, Greece.

Nokia, Nokia Shanghai Bell, "Stage 3 aspects for encoding of paging message with truncated UE-1D", 3GPP TSG-RAN WG2 Meeting #102, R2-1806988, May 21-25, 2018, 6 pages, Busan, South Korea.

Ericsson, "Indication of CN initiated or RAN initiated paging", 3GPP TSG-RAN WG2 #102, Tdoc R2-1806807, May 21-25, 2018, 6 pages, Busan, Republic of Korea.

Ericsson, "CR to 36.331 on alignment of use of fulll-RNTI and I-RNTI in paging and Inactive Config (Alt.2)", 3GPP TSG-RAN WG2#104, R2-1818984, Nov. 12-16, 2018, 12 pages, Spokane, USA.

3GPP TS 38.212 V15.3.0 (Sep. 2018), 3rd Generation Partnership Project, Technical Specification Group Radio Access Network, NR, Multiplexing and channel coding (Release 15), 99 pages.

Ericsson, "Indication of CN initiated or RAN initiated paging", 3GPP TSG-RAN WG2 #101, Tdoc R2-1802341, Feb. 26-Mar. 2, 2018, 3 pages, Athens, Greece.

3GPP TS 38.331 V15.3.0 (Sep. 2018), 3rd Generation Partnership Project, Technical Specification Group Radio Access Network, NR, Radio Resource Control (RRC) protocol specification (Release 15), 445 pages.

Ericsson, "Indication of CN initiated or RAN initiated paging", 3GPP TSG-RAN WG2 #101bis, Tdoc R2-1804735, Apr. 16-20, 2018, 3 pages, Sanya, China.

* cited by examiner

COMMUNICATION METHOD AND APPARATUS

CROSS-REFERENCE TO RELATED APPLICATIONS

This application is a continuation of International Application No. PCT/CN2019/123400, filed on Dec. 5, 2019, which claims priority to claims priority to Chinese Patent Application No. 201811573682.X, filed on Dec. 21, 2018. The disclosures of the aforementioned applications are hereby incorporated by reference in their entireties.

TECHNICAL FIELD

This application relates to the field of communications technologies, and in particular, to a communication method and apparatus.

BACKGROUND

In a long term evolution (LTE) system, a terminal has two radio resource control (RRC) states: an RRC_CONNECTED state and an RRC_IDLE state.

To reduce signaling overheads and power consumption of a terminal, a third state, namely, a radio resource control inactive (RRC INACTIVE) state, is introduced in a $5^{th}$-generation (5G) mobile communications technology. In the RRC INACTIVE state, the terminal is in a power-saving sleep state, but the terminal still retains a part of radio access network (RAN) contexts (for example, a security context and terminal capability information), and always maintains a connection between a 5G core network and a RAN. Therefore, when it's needed to communicate with a terminal, the terminal can quickly switch from the RRC INACTIVE state to the RRC CONNECTED state.

Therefore, another paging process, namely, RAN paging, is introduced in 5G. The RAN paging is only for a terminal in the RRC_INACTIVE state. Therefore, currently, there is no relatively good solution to paging terminals in these two manners.

SUMMARY

This application provides a communication method and apparatus, to separately page a terminal in an RRC_IDLE state or an RRC INACTIVE state.

According to a first aspect, a communication method is provided. The method may be applied to a terminal and a network device. In the method, the network device first sends first indication information before sending a paging message, where the first indication information is used to indicate whether at least two terminals in an RRC_IDLE state or an RRC_INACTIVE state need to receive the paging message. In this way, after each of the at least two terminals receives the first indication information, the terminal may determine, based on the first indication information, whether the terminal needs to receive the paging message. If determining that the terminal needs to receive the paging message, the terminal may detect and receive the paging message on a corresponding time-frequency resource after the network device sends the paging message.

In the foregoing technical solution, if determining that the terminal does not need to receive the paging message, the terminal does not need to detect the paging message. For example, if the paging message is for a terminal in the RRC_INACTIVE state, the network device may indicate, by using the first indication information, that a terminal in the RRC_IDLE state does not need to receive the paging message. In this way, the terminal in the RRC_IDLE state determines, based on the first indication information, that the terminal does not need to receive the paging message, and the terminal in the RRC_INACTIVE state receives the paging message on the corresponding time-frequency resource. If the paging message is for a terminal in either of the RRC_IDLE state and the RRC_INACTIVE state, the network device may indicate, by using the first indication information, the terminal in the RRC_IDLE state to receive the paging message. In this way, the terminal in the RRC_IDLE state determines, based on the first indication information, to receive the paging message, and both the terminal in the RRC_IDLE state and the terminal in the RRC_INACTIVE state receive the paging message on the corresponding time-frequency resource. Therefore, paging the terminals in these two manners can be implemented.

In a possible design, the first indication information includes at least one of the following information:
whether the terminal in the RRC_IDLE state needs to receive the paging message;
the paging message is initiated by a core network;
the paging message is initiated by a radio access network; or
the paging message is initiated by the core network and the radio access network.

In the foregoing technical solution, the network device may indicate, by using any one or more of a plurality of types of information, whether the at least two terminals are to receive the paging message. This can improve flexibility of the network device.

In a possible design, the first indication information is carried in a first message, and the first message includes system message update indication information and/or scheduling information of the paging message. The scheduling information includes a coding scheme of a paged terminal and the time-frequency resource that is for the paging message and that is on a downlink shared channel.

In the foregoing technical solution, the first indication information is carried in the first message. In a possible design, the first message is paging control information, so that signaling overheads between the terminal and the network device can be reduced.

In a possible design, the paging message includes an identifier of at least one terminal, the identifier of the at least one terminal includes at least one first identifier and at least one second identifier, the first identifier is an identifier of the terminal in the RRC_IDLE state, the second identifier is an identifier of the terminal in the RRC_INACTIVE state, and the at least one first identifier and the at least one second identifier are arranged according to a preset rule.

In the foregoing technical solution, identifiers of terminals in different states are arranged according to the preset rule. In this way, when searching the paging message for whether an identifier of the terminal is included, the terminal may perform a search according to the preset rule. In this way, a time for the terminal to search the paging message for whether the identifier of the terminal is included can be reduced, so that the terminal can respond, within a relatively short time, to the paging message used to page the terminal.

In a possible design, the preset rule includes one of the following rules:
the identifier of the at least one terminal is located in one list, and each of the at least one first identifier is located before any one of the at least one second identifier;

the identifier of the at least one terminal is located in one list, and each of the at least one second identifier is located before any one of the at least one first identifier; or the identifier of the at least one terminal is classified into two lists, the first list in the two lists includes the at least one first identifier, and the second list in the two lists includes the at least one second identifier.

In the foregoing technical solution, the identifier that is of the at least one terminal and that is included in the paging message may be arranged in a plurality of different manners, so that the network device can perform configuration based on an actual status. This can improve the flexibility of the network device.

In a possible design, the network device may further send, to the at least two terminals, second indication information used to indicate the preset rule. In this way, after receiving the second indication information, the terminal may search, according to the preset rule, the paging message for whether the identifier of the terminal is carried.

In a possible design, the second indication information includes at least one of the following information:
an offset between the $1^{st}$ second identifier and the $1^{st}$ first identifier in the one list;
a mapping relationship between the first list in the two lists and the at least one first identifier; or
a mapping relationship between the second list in the two lists and the at least one second identifier.

In the foregoing technical solution, the network device may indicate the preset rule in any one or more of a plurality of manners. This can further improve the flexibility of the network device.

In a possible design, the paging message includes the second indication information.

In the foregoing technical solution, the second indication information may be carried in the paging message, so that the signaling overheads between the terminal and the network device can be reduced.

In a possible design, after any one of the at least two terminals in the RRC_IDLE state or the RRC_INACTIVE state receives the paging message, the terminal may search the at least one first identifier or the at least one second identifier for an identifier of the terminal based on a status of the terminal. For example, when the terminal is in the RRC_IDLE state, the terminal may search the at least one first identifier for the identifier of the terminal. When the terminal is in the RRC_INACTIVE state, the terminal may search the at least one second identifier for the identifier of the terminal. When the at least one first identifier or the at least one second identifier includes the identifier of the terminal, the terminal sends, to the network device, a response message used to set up a radio resource control RRC connection to the network device.

In the foregoing technical solution, the at least one first identifier and the at least one second identifier in the paging message have been arranged according to the preset rule, for example, the at least one first identifier is arranged before the at least one second identifier. Therefore, when the terminal is in the RRC_IDLE state, the terminal may search the identifier that is of the terminal and that is included in the paging message from front to back, and may search only the first identifier in the paging message, so that duration of determining, by the terminal, whether the paging message includes the identifier of the terminal can be reduced, and a response speed of the terminal to the paging message can be accelerated.

According to a second aspect, a communication apparatus is provided. The communication apparatus includes a processor, configured to implement the method performed by the network device in the first aspect. The communication apparatus may further include a memory, configured to store program instructions and data. The memory is coupled to the processor. The processor may invoke and execute the program instructions stored in the memory, to implement any method performed by the network device in the first aspect. The communication apparatus may further include a transceiver, and the transceiver is used by the communication apparatus to communicate with another device. For example, the another device is a terminal.

In a possible design, the communication apparatus includes the processor and the transceiver.

The transceiver is configured to send first indication information under control of the processor, where the first indication information is used by at least two terminals to determine whether to receive a paging message, each of the at least two terminals is a terminal in a radio resource control idle RRC_IDLE state or a radio resource control inactive RRC_INACTIVE state, and the paging message is used to page a part or all of the at least two terminals.

The transceiver is configured to send the paging message under the control of the processor.

In a possible design, the first indication information includes at least one of the following information:
whether the terminal in the RRC_IDLE state needs to receive the paging message;
the paging message is initiated by a core network;
the paging message is initiated by a radio access network; or
the paging message is initiated by the core network and the radio access network.

In a possible design, the first indication information is carried in a first message, and the first message includes system message update indication information and/or scheduling information of the paging message. The scheduling information includes a coding scheme of a paged terminal and a time-frequency resource that is for the paging message and that is on a downlink shared channel.

In a possible design, the first message is paging control information.

In a possible design, the paging message includes an identifier of at least one terminal, the identifier of the at least one terminal includes at least one first identifier and at least one second identifier, the first identifier is an identifier of the terminal in the RRC_IDLE state, the second identifier is an identifier of the terminal in the RRC_INACTIVE state, and the at least one first identifier and the at least one second identifier are arranged according to a preset rule.

In a possible design, the preset rule includes one of the following rules:
the identifier of the at least one terminal is located in one list, and each of the at least one first identifier is located before any one of the at least one second identifier;
the identifier of the at least one terminal is located in one list, and each of the at least one second identifier is located before any one of the at least one first identifier; or
the identifier of the at least one terminal is classified into two lists, the first list in the two lists includes the at least one first identifier, and the second list in the two lists includes the at least one second identifier.

In a possible design, the transceiver is further configured to: send second indication information under the control of the processor, where the second indication information is used to indicate the preset rule.

In a possible design, the second indication information includes at least one of the following information:
an offset between the $1^{st}$ second identifier and the $1^{st}$ first identifier in the one list;
a mapping relationship between the first list in the two lists and the at least one first identifier; or
a mapping relationship between the second list in the two lists and the at least one second identifier.

In a possible design, the paging message includes the second indication information.

According to a third aspect, a communication apparatus is provided. The communication apparatus includes a processor, configured to implement the method performed by the terminal in the first aspect. The communication apparatus may further include a memory, configured to store program instructions and data. The memory is coupled to the processor. The processor may invoke and execute the program instructions stored in the memory, to implement any method performed by the terminal in the first aspect. The communication apparatus may further include a transceiver, and the transceiver is used by the communication apparatus to communicate with another device. For example, the another device is a network device.

In a possible design, the communication apparatus includes the processor and the transceiver.

The transceiver is configured to receive first indication information under control of the processor, where the first indication information is used by at least two terminals to determine whether to receive a paging message, each of the at least two terminals is a terminal in a radio resource control idle RRC_IDLE state or a radio resource control inactive RRC_INACTIVE state, and the paging message is used to page a part or all of the at least two terminals.

The processor is configured to control the transceiver to monitor the paging message when the processor determines, based on the first indication information, to receive the paging message.

In a possible design, the first indication information includes at least one of the following information:
whether the terminal in the RRC_IDLE state needs to receive the paging message;
the paging message is initiated by a core network;
the paging message is initiated by a radio access network; or
the paging message is initiated by the core network and the radio access network.

In a possible design, the first indication information is carried in a first message, and the first message includes system message update indication information and/or scheduling information of the paging message. The scheduling information includes a coding scheme of a paged terminal and a time-frequency resource that is for the paging message and that is on a downlink shared channel.

In a possible design, the first message is paging control information.

In a possible design, the paging message includes an identifier of at least one terminal, the identifier of the at least one terminal includes at least one first identifier and at least one second identifier, the first identifier is an identifier of the terminal in the RRC_IDLE state, the second identifier is an identifier of the terminal in the RRC_INACTIVE state, and the at least one first identifier and the at least one second identifier are arranged according to a preset rule.

In a possible design, the preset rule includes one of the following rules:

the identifier of the at least one terminal is located in one list, and each of the at least one first identifier is located before any one of the at least one second identifier;
the identifier of the at least one terminal is located in one list, and each of the at least one second identifier is located before any one of the at least one first identifier; or
the identifier of the at least one terminal is classified into two lists, the first list in the two lists includes the at least one first identifier, and the second list in the two lists includes the at least one second identifier.

In a possible design, the transceiver is further configured to: receive second indication information under the control of the processor, where the second indication information is used to indicate the preset rule.

In a possible design, the second indication information includes at least one of the following information:
an offset between the $1^{st}$ second identifier and the $1^{st}$ first identifier in the one list;
a mapping relationship between the first list in the two lists and the at least one first identifier; or
a mapping relationship between the second list in the two lists and the at least one second identifier.

In a possible design, the paging message includes the second indication information.

In a possible design, the transceiver is further configured to: receive the paging message under the control of the processor.

The processor is further configured to search the at least one first identifier or the at least one second identifier for an identifier of a terminal based on a status of the terminal, where the status of the terminal includes the RRC_IDLE state or the RRC_INACTIVE state. When the terminal is in the RRC_IDLE state, the processor is configured to search the at least one first identifier for the identifier of the terminal. When the terminal is in the RRC_INACTIVE state, the processor is configured to search the at least one second identifier for the identifier of the terminal.

When the at least one first identifier or the at least one second identifier includes the identifier of the terminal, the processor is configured to control the transceiver to send a response message, where the response message is used to set up a radio resource control RRC connection to the network device.

According to a fourth aspect, a communication apparatus is provided. The communication apparatus may be a network device, or may be an apparatus in a network device. The communication apparatus may include a processing module and a communication module. These modules may perform a corresponding function performed by the network device in any design example in the first aspect. Details are as follows:

The communication module is configured to send first indication information under control of the processing module, where the first indication information is used by at least two terminals to determine whether to receive a paging message, each of the at least two terminals is a terminal in a radio resource control idle RRC_IDLE state or a radio resource control inactive RRC_INACTIVE state, and the paging message is used to page a part or all of the at least two terminals.

The communication module is configured to send the paging message under the control of the processing module.

In a possible design, the first indication information includes at least one of the following information:
whether the terminal in the RRC_IDLE state needs to receive the paging message;

the paging message is initiated by a core network;
the paging message is initiated by a radio access network; or
the paging message is initiated by the core network and the radio access network.

In a possible design, the first indication information is carried in a first message, and the first message includes system message update indication information and/or scheduling information of the paging message. The scheduling information includes a coding scheme of a paged terminal and a time-frequency resource that is for the paging message and that is on a downlink shared channel.

In a possible design, the first message is paging control information.

In a possible design, the paging message includes an identifier of at least one terminal, the identifier of the at least one terminal includes at least one first identifier and at least one second identifier, the first identifier is an identifier of the terminal in the RRC_IDLE state, the second identifier is an identifier of the terminal in the RRC_INACTIVE state, and the at least one first identifier and the at least one second identifier are arranged according to a preset rule.

In a possible design, the preset rule includes one of the following rules:
the identifier of the at least one terminal is located in one list, and each of the at least one first identifier is located before any one of the at least one second identifier;
the identifier of the at least one terminal is located in one list, and each of the at least one second identifier is located before any one of the at least one first identifier; or
the identifier of the at least one terminal is classified into two lists, the first list in the two lists includes the at least one first identifier, and the second list in the two lists includes the at least one second identifier.

In a possible design, the communication module is further configured to:
send second indication information under the control of the processing module, where the second indication information is used to indicate the preset rule.

In a possible design, the second indication information includes at least one of the following information:
an offset between the $1^{st}$ second identifier and the $1^{st}$ first identifier in the one list;
a mapping relationship between the first list in the two lists and the at least one first identifier; or
a mapping relationship between the second list in the two lists and the at least one second identifier.

In a possible design, the paging message includes the second indication information.

According to a fifth aspect, a communication apparatus is provided. The communication apparatus may be a terminal, or may be an apparatus in a terminal. The communication apparatus may include a processing module and a communication module. These modules may perform a corresponding function performed by the terminal in any design example in the first aspect. Details are as follows:

The communication module is configured to receive first indication information under control of the processing module, where the first indication information is used by at least two terminals to determine whether to receive a paging message, each of the at least two terminals is a terminal in a radio resource control idle RRC_IDLE state or a radio resource control inactive RRC_INACTIVE state, and the paging message is used to page a part or all of the at least two terminals.

The processing module is configured to control the communication module to monitor the paging message when the processing module determines, based on the first indication information, to receive the paging message.

In a possible design, the first indication information includes at least one of the following information:
whether the terminal in the RRC_IDLE state needs to receive the paging message;
the paging message is initiated by a core network;
the paging message is initiated by a radio access network; or
the paging message is initiated by the core network and the radio access network.

In a possible design, the first indication information is carried in a first message, and the first message includes system message update indication information and/or scheduling information of the paging message. The scheduling information includes a coding scheme of a paged terminal and a time-frequency resource that is for the paging message and that is on a downlink shared channel.

In a possible design, the first message is paging control information.

In a possible design, the paging message includes an identifier of at least one terminal, the identifier of the at least one terminal includes at least one first identifier and at least one second identifier, the first identifier is an identifier of the terminal in the RRC_IDLE state, the second identifier is an identifier of the terminal in the RRC_INACTIVE state, and the at least one first identifier and the at least one second identifier are arranged according to a preset rule.

In a possible design, the preset rule includes one of the following rules:
the identifier of the at least one terminal is located in one list, and each of the at least one first identifier is located before any one of the at least one second identifier;
the identifier of the at least one terminal is located in one list, and each of the at least one second identifier is located before any one of the at least one first identifier; or
the identifier of the at least one terminal is classified into two lists, the first list in the two lists includes the at least one first identifier, and the second list in the two lists includes the at least one second identifier.

In a possible design, the communication module is further configured to: receive second indication information under the control of the processing module, where the second indication information is used to indicate the preset rule.

In a possible design, the second indication information includes at least one of the following information:
an offset between the $1^{st}$ second identifier and the $1^{st}$ first identifier in the one list;
a mapping relationship between the first list in the two lists and the at least one first identifier; or
a mapping relationship between the second list in the two lists and the at least one second identifier.

In a possible design, the paging message includes the second indication information.

In a possible design, the communication module is further configured to: receive the paging message under the control of the processing module.

The processing module is further configured to search the at least one first identifier or the at least one second identifier for an identifier of the terminal based on a status of the terminal, where the status of the terminal includes the RRC_IDLE state or the RRC_INACTIVE state. When the terminal is in the RRC_IDLE state, the processing module is configured to search the at least one first identifier for the identifier of the terminal. When the terminal is in the RRC_INACTIVE state, the processing module is configured to search the at least one second identifier for the identifier of the terminal.

When the at least one first identifier or the at least one second identifier includes the identifier of the terminal, the processing module is configured to control the communication module to send a response message, where the response message is used to set up a radio resource control RRC connection to a network device.

According to a sixth aspect, an embodiment of this application further provides a computer-readable storage medium, including instructions. When the instructions are run on a computer, the computer is enabled to perform the method performed by the network device in the first aspect.

According to a seventh aspect, an embodiment of this application further provides a computer-readable storage medium, including instructions. When the instructions are run on a computer, the computer is enabled to perform the method performed by the terminal in the first aspect.

According to an eighth aspect, an embodiment of this application further provides a computer program product, including instructions. When the instructions are run on a computer, the computer is enabled to perform the method performed by the network device in the first aspect.

According to a ninth aspect, an embodiment of this application further provides a computer program product, including instructions. When the instructions are run on a computer, the computer is enabled to perform the method performed by the terminal in the first aspect.

According to a tenth aspect, an embodiment of this application provides a chip system. The chip system includes a processor, and may further include a memory. The chip system is configured to implement the method performed by the network device in the first aspect. The chip system may include a chip, or may include a chip and another discrete component.

According to an eleventh aspect, an embodiment of this application provides a chip system. The chip system includes a processor, and may further include a memory. The chip system is configured to implement the method performed by the terminal in the first aspect. The chip system may include a chip, or may include a chip and another discrete component.

According to a twelfth aspect, an embodiment of this application provides a system. The system includes the communication apparatus in the second aspect and the communication apparatus in the third aspect.

According to a thirteenth aspect, an embodiment of this application provides a system. The system includes the communication apparatus in the fourth aspect and the communication apparatus in the fifth aspect.

For beneficial effects of the second aspect to the thirteenth aspect and the implementations of the second aspect to the thirteenth aspect, refer to the descriptions of the beneficial effects of the method in the first aspect and the implementations of the first aspect.

DETAILED DESCRIPTION OF ILLUSTRATIVE EMBODIMENTS

Figure 1:
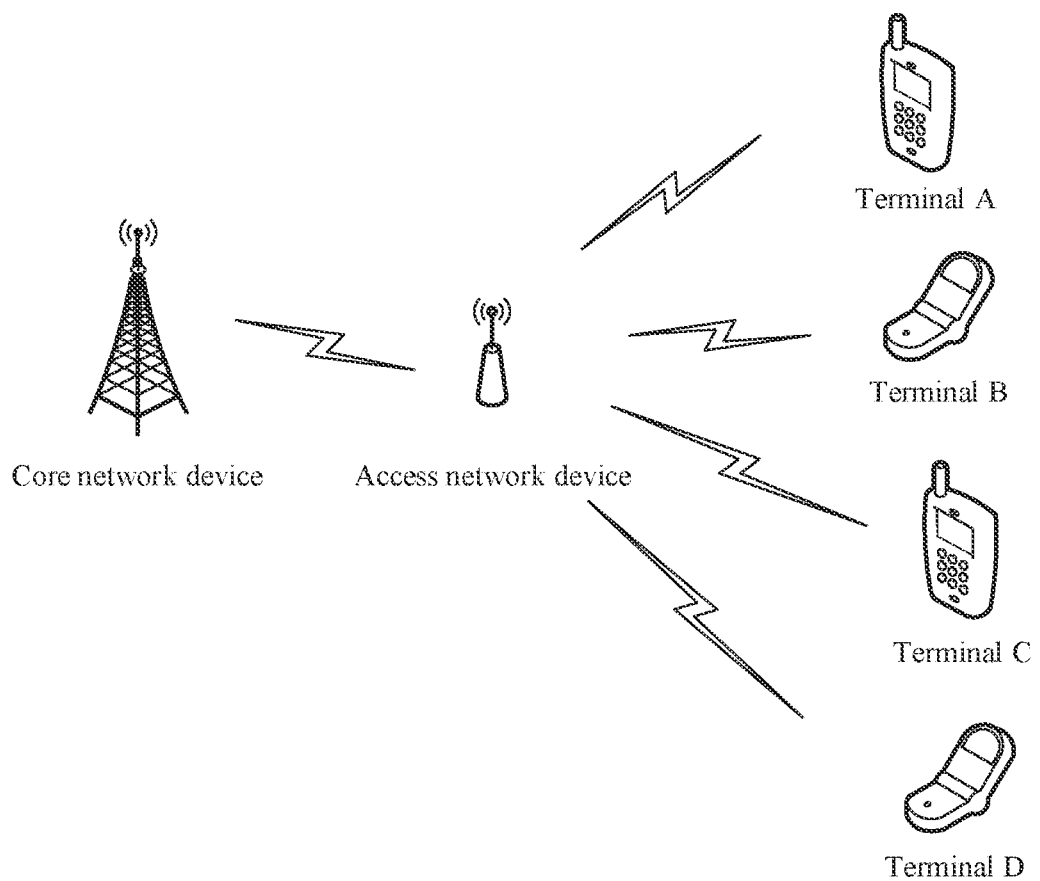
FIG. 1 is a schematic diagram of a network architecture used in an embodiment of this application is applied.

To make objectives, technical solutions, and advantages of embodiments of this application clearer, the following further describes the embodiments of this application in detail with reference to the accompanying drawings.

Some terms in the embodiments of this application are described below, to help a person skilled in the art have a better understanding.

(1) A terminal is also referred to as a terminal device, user equipment (UE), a mobile station (MS), a mobile terminal (MT), or the like, and is a device that provides voice and/or data connectivity for a user. For example, the terminal may include a handheld device with a wireless connection function or a processing device connected to a wireless modem. The terminal may communicate with a core network through a radio access network (RAN), and exchange a voice and/or data with the RAN. The terminal may include user equipment (UE), a wireless terminal, a mobile terminal, a subscriber unit, a subscriber station, a mobile station, a remote station, an access point (AP), a remote terminal, an access terminal, a user terminal, a user agent, a user device, or the like. For example, the terminal may include a mobile phone (or referred to as a "cellular" phone), a computer with a mobile terminal, a portable, pocket-sized, handheld, computer built-in, or in-vehicle mobile apparatus, and an intelligent wearable device. For example, the terminal is a personal communications service (PCS) phone, a cordless telephone set, a session initiation protocol (SIP) phone, a wireless local loop (WLL) station, or a personal digital assistant (PDA). The terminal further includes a limited device such as a device with relatively low power consumption, a device with a limited storage capability, or a device with a limited computing capability. For example, the terminal includes an information sensing device such as a barcode, a radio frequency identification (RFID) device, a sensor, a global positioning system (GPS), or a laser scanner.

By way of example rather than limitation, in the embodiments of this application, the terminal may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not only a hardware device, but implements powerful functions through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application functions and need to work with other devices such as smartphones. The terminal may alternatively be a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

(2) A network device may be a (radio) access network ((R)AN) device, a core network (CN) device, or a combination thereof.

The (R)AN device includes, for example, a base station (such as an access point), and may be a device that is in an access network and that communicates with a wireless terminal over an air interface and through one or more cells. The (radio) access network device may be configured to perform mutual conversion between a received over-the-air frame and an Internet protocol (IP) packet, and serve as a router between a terminal and a remaining portion of the access network, and the remaining portion of the access network may include an IP network. The (radio) access network device may further coordinate attribute management of the air interface. For example, the (radio) access network device may include a radio network controller (RNC), a NodeB (Node B, NB), a base station controller (BSC), a base transceiver station (BTS), a home base station (for example, home evolved NodeB, or home Node B, HNB), a baseband unit (base band unit, BBU), or a wireless fidelity (Wi-Fi) access point (AP), or may include an evolved NodeB (NodeB, eNB, or e-NodeB, evolutional Node B) in a long term evolution (LTE) system or an LTE-advanced (LTE-A) system, or may include a next generation NodeB (next generation node B, gNB), a transmission reception point (transmission and reception point, TRP), or a transmission point (TP) in a 5G system or a new radio (NR) system, or may include a centralized unit (CU) and a distributed unit (DU) in a cloud radio access network (CloudRAN) system. This is not limited in the embodiments of this application. The terms "access network device" and "(radio) access network device" may be interchangeably used below.

The CN device is connected to a plurality of access networks, and includes a circuit switched (CS) domain and a packet switched (PS) domain. A CS network element has a mobile switching center, a visited location register, and a gateway mobile switching center. A PS network element has a serving GPRS support node and a gateway GPRS support node. Some network elements such as a home location register, the visited location register, and an authentication center may be shared by the CS domain and the PS domain.

(3) Time-frequency resource: A time-frequency resource in a wireless communications system is usually described in physical resource blocks (PRB) or RBs. One PRB includes two slots, namely, 14 orthogonal frequency division multiplexing multiple access (OFDM) symbols, in time domain, and includes 12 subcarriers in frequency domain. One PRB includes two adjacent RBs. In other words, one RB includes 12 subcarriers in frequency domain, and includes one slot in time domain. It should be noted that the terms "time-frequency resource" and "resource" in the embodiments of this application may be used interchangeably.

(4) A downlink shared channel may be a physical downlink shared channel (PDSCH), a machine type communication physical downlink shared channel (MTC physical downlink shared channel, MPDSCH), a narrowband physical downlink shared channel (NPDSCH), or the like.

(5) The term "a plurality of" in the embodiments of this application means two or more than two. In view of this, "a plurality of" in the embodiments of this application may also be understood as "at least two". The term "at least one" may be understood as one or more, for example, understood as one, two, or more. For example, including at least one means including one, two, or more, and does not limit what are included. For example, including at least one of A, B, and C means that A, B, C, A and B, A and C, B and C, or all of A, B, and C may be included. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between associated objects. The terms "system" and "network" may be used interchangeably in the embodiments of this application.

Unless otherwise stated on the contrary, ordinal numerals such as "first" and "second" in the embodiments of this application are used to distinguish between a plurality of objects, and are not intended to limit a sequence, a time sequence, a priority, or an importance degree of the plurality of objects.

The foregoing describes some concepts in the embodiments of this application. The following describes technical features in the embodiments of this application.

In LTE, a terminal includes two RRC states: an RRC_CONNECTED state and an RRC_IDLE state. After the terminal is powered on, the terminal is first in the RRC_IDLE state. After the terminal initiates an RRC connection setup request and successfully sets up an RRC connection to a base station, the terminal enters the RRC_CONNECTED state, and may further communicate with a core network device. If the terminal fails to initiate the RRC connection request setup or the terminal releases the RRC connection, the terminal enters the RRC_IDLE state. When the terminal is in the RRC_IDLE state, the core network device needs to send a paging message to the terminal if the core network device is to send data to the terminal. In this way, after receiving the paging message used to page the terminal, the terminal sets up an RRC connection to receive the data.

A process in which the terminal switches from the RRC_IDLE state to the RRC_CONNECTED state requires a delay. Therefore, an RRC INACTIVE state is introduced in a 5G system to support fast recovery of the RRC connection. The terminal in the RRC INACTIVE state always maintains a connection between a 5G core network and the base station. Therefore, the base station that manages the terminal may receive, from the 5G core network, the data to be sent to the terminal. After receiving the data sent by the 5G core network, the base station pages the terminal.

It can be learned from the foregoing descriptions that there are two paging manners in the 5G system. A first paging manner is paging a terminal in the RRC_IDLE state, and a second paging manner is paging a terminal in the RRC INACTIVE state. The first paging manner is initiated by the core network device, and therefore, may also be referred to as CN paging. The second paging manner is initiated by an access network device, and therefore, may also be referred to as RAN paging. The terminal in the RRC_IDLE state may only need to receive the CN paging, and the terminal in the INACTIVE state may receive the CN paging and the RAN paging.

Currently, there is no relatively good solution to paging terminals in the two manners.

In view of this, the embodiments of this application provide a communication method. In the method, when paging a part or all of terminals in an RRC_IDLE state or an RRC_INACTIVE state, a network device first sends first indication information before sending a paging message, where the first indication information is used to indicate whether the terminal in the RRC_IDLE state or the RRC_INACTIVE state needs to receive the paging message. In this way, after each of at least two terminals receives the first indication information, the terminal may determine, based on the first indication information, whether the terminal needs to receive the paging message. If determining that the paging message needs to be received, the terminal may detect and receive the paging message on a corresponding time-frequency resource. If determining that the paging message does not need to be received, the terminal does not need to detect the paging message. For example, if the paging message is for the terminal in the RRC_INACTIVE state, the network device may indicate, by using the first indication information, that the terminal in the RRC_IDLE state does not need to receive the paging message. In this way, the terminal in the RRC_IDLE state determines, based on the first indication information, that the terminal does not need to receive the paging message; and continues to remain in the RRC_IDLE state. The terminal in the RRC_INACTIVE state receives the paging message on the corresponding time-frequency resource. If the paging message is for the terminal in the RRC_IDLE state or for the terminal in the RRC_IDLE state and the terminal in the RRC_INACTIVE state (in other words, the paging message may be used to page the terminal in either of the RRC_IDLE state and the RRC_INACTIVE state), the network device may indicate, by using the first indication information, the terminal in the RRC_IDLE state to receive the paging message. In this way, the terminal in the RRC_IDLE state determines, based on the first indication information, to receive the paging message, and both the terminal in the RRC_IDLE state and the terminal in the RRC_INACTIVE state receive the paging message on the corresponding time-frequency resource. Therefore, paging the terminals in the two manners can be implemented.

The technical solutions provided in the embodiments of this application may be applied to a 5G system, a long term evolution-advanced (LTE-A) system, a worldwide interoperability for microwave access (WiMAX) system, a wireless local area network (WLAN) system, or the like.

In addition, the communications systems may be further applicable to a future-oriented communications technology. The systems described in the embodiments of this application are intended to describe the technical solutions in the embodiments of this application more clearly, and constitute no limitation on the technical solutions provided in the embodiments of this application. A person of ordinary skill in the art may learn that, with evolution of network architectures, the technical solutions provided in the embodiments of this application are also applicable to a similar technical problem.

The following describes a network architecture used in an embodiment of this application is applied. Refer to FIG. 1.

FIG. 1 includes a core network device, an access network device, and five terminals. The five terminals are a terminal A to a terminal E. The terminal A to the terminal E are all located within coverage of the access network device and can communicate with an access network. A quantity of terminals in FIG. 1 is merely an example. In an actual application, the access network device may serve more terminals. In addition, although the core network device, the access network device, and the terminals are shown in the network architecture shown in FIG. 1, the network architecture may not be limited to including the core network device, the access network device, and the terminals. For example, the network architecture may further include a wireless relay device and a device for carrying a virtualized network function. These devices are obvious to a person of ordinary skill in the art, and are not described in detail herein.

The access network device in FIG. 1 is, for example, a base station. The access network device corresponds to different devices in different systems. For example, the access network device may correspond to an eNB in a system of a $4^{th}$-generation (4G) mobile communications technology, and may correspond to a gNB in a 5G system.

The following describes, with reference to the accompanying drawings, the technical solutions provided in the embodiments of this application.

Figure 2:
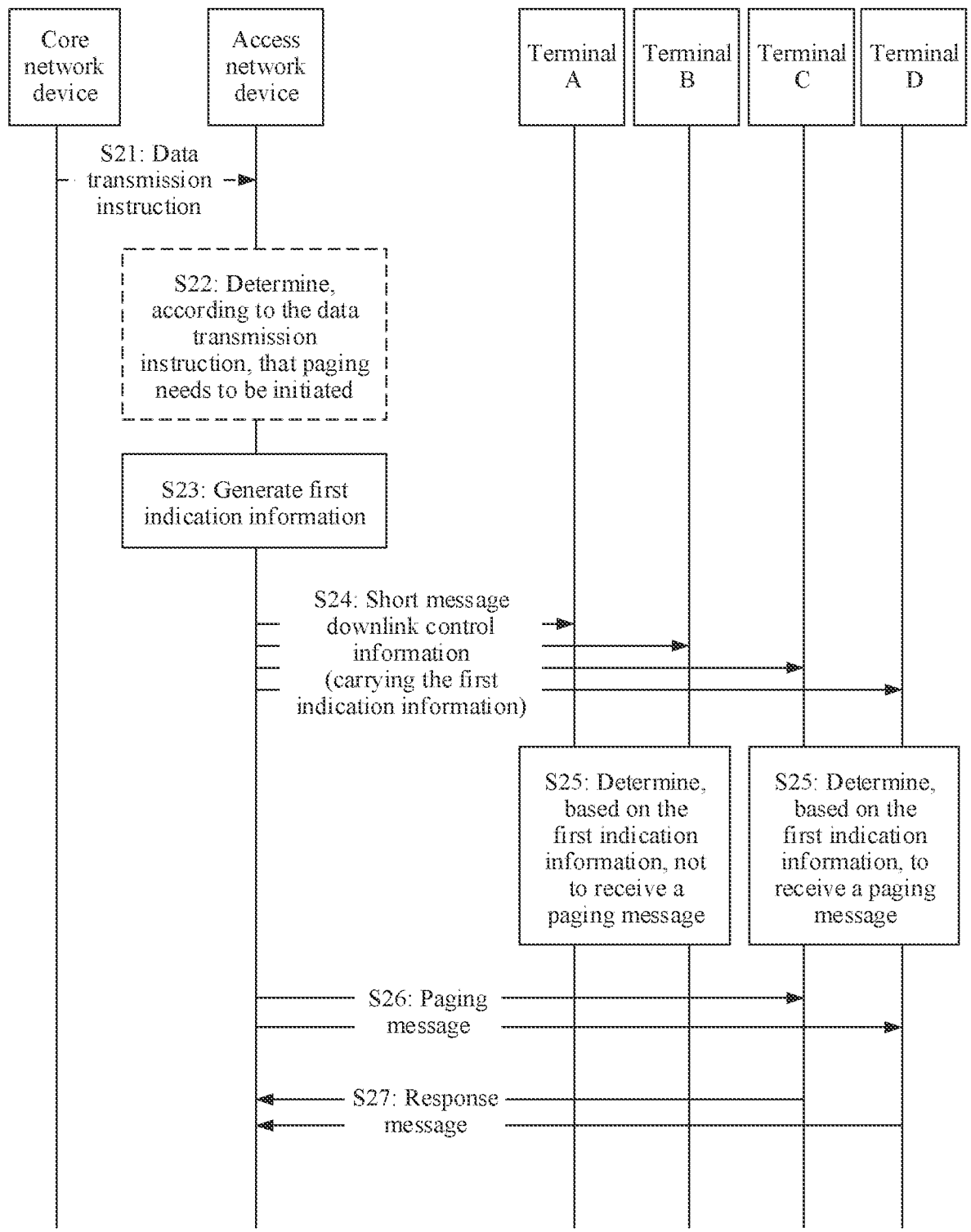
FIG. 2 is a flowchart of an example of a communication method according to an embodiment of this application.

An embodiment of this application provides a communication method. FIG. 2 is a flowchart of the method.

In the following description process, an example in which the method is applied to the network architecture shown in FIG. 1 is used. In other words, a network device described below may be the access network device in the network architecture shown in FIG. 1, and a terminal described below may be one of the terminals in the network architecture shown in FIG. 1. In addition, the method may be performed by two communication apparatuses. The two communication apparatuses are, for example, a first communication apparatus and a second communication apparatus. The first communication apparatus may be the access network device or a communication apparatus that can support the access network device in implementing functions required in the method. Certainly, the first communication apparatus may alternatively be another communication apparatus, for example, a chip system. The same applies to the second communication apparatus. For example, the second communication apparatus may be the terminal or a communication apparatus that can support the terminal in implementing functions required in the method. Certainly, the second communication apparatus may alternatively be another communication apparatus, for example, a chip system. Implementations of the first communication apparatus and the second communication apparatus are not limited.

For ease of description, an example in which the method is performed by the access network device and the terminal is used below, in other words, an example in which the first communication apparatus is the access network device and the second communication apparatus is the terminal is used.

S21: A core network device sends a data transmission instruction, and the access network device receives the data transmission instruction.

When needing to communicate with at least one terminal, for example, to send service data to the at least one terminal, the core network device needs to determine whether there is a network connection that corresponds to each of the at least one terminal and that is between the core network device and the access network device. When there is the network connection that corresponds to the terminal and that is between the core network device and the access network device, the core network device sends the data transmission instruction to the corresponding access network device based on the network connection.

In an example, in FIG. 1, the terminal A and the terminal B are in an RRC_IDLE state, the terminal C and the terminal D are in an RRC_INACTIVE state, and the terminal E is in an RRC_CONNECTED state. The core network device needs to send the service data to the terminal C and the terminal D in FIG. 1. Therefore, the core network device sends the data transmission instruction to the access network device, where the data transmission instruction carries the service data and identifiers of the terminal C and the terminal D.

S22: The access network device determines, according to the data transmission instruction, that paging needs to be initiated.

After receiving the data transmission instruction, the access network device determines whether there is an RRC connection to each of the at least one terminal indicated in the data transmission instruction. If there is no RRC connection to the terminal, the access network device determines that paging of the terminal needs to be initiated. In an example, if determining that the data transmission instruction carries the identifiers of the terminal C and the terminal D, the access network device determines whether there is an RRC connection to the terminal C in a memory of the access network device and whether there is an RRC connection to the terminal D in the access network device. When determining that there is no RRC connection to the terminal C and no RRC connection to the terminal D in the access network device, the access network device determines that the terminal C and the terminal D need to be paged.

Certainly, if determining that there is no RRC connection to a part of the at least one terminal, the access network device may page only the part of the at least one terminal. For example, if determining that there is no RRC connection to the terminal C but there is the RRC connection to the terminal D, the access network device may page only the terminal C.

It should be noted that, in step S22, the access network device merely determines whether paging needs to be initiated, but has not sent a paging message for the terminal.

In addition, it should be noted that step S21 and step S22 are optional steps, in other words, step S21 and step S22 are not mandatory to be performed. For example, the access network device may periodically trigger paging of the terminal.

S23: The access network device generates first indication information.

In this embodiment of this application, the first indication information is used by at least two terminals in the RRC_IDLE state or the RRC_INACTIVE state to determine whether to receive a paging message, and the paging message is used to page a part or all of the at least two terminals. It should be understood that the paging message is a paging message to be sent. Alternatively, it may be understood that a time interval between a sending moment of the paging message and a sending moment of the first indication information is a preset threshold, and the preset threshold may be 1 ms, 0.5 ms, or the like. This is not limited herein.

It can be learned from the foregoing descriptions that paging performed on the terminal in the RRC_IDLE state and paging performed on the terminal in the RRC_INACTIVE state are two different paging manners. Therefore, in this embodiment of this application, to page the terminals in the two different paging manners, the access network device generates the first indication information before sending the paging message, so that the terminal in the RRC_IDLE state or the terminal in the RRC_INACTIVE state can determine, based on the first indication information, whether the paging message needs to be received. For example, when the paging message is for the terminal in the RRC_INACTIVE state, the terminal in the RRC_IDLE state may determine, based on the first indication information, that the paging message does not need to be received, so that only the terminal in the RRC_INACTIVE state is paged. In addition, because the terminal in the RRC_IDLE state may not monitor the paging performed on the terminal in the RRC_INACTIVE state, power consumption of the terminal can be reduced.

In this embodiment of this application, content indicated by the first indication information may include but is not limited to the following three cases:

(1) Whether the terminal in the RRC_IDLE state needs to receive the paging message If the paging message is for the terminal in the RRC_IDLE state, it is determined that the terminal in the RRC_IDLE state needs to receive the paging message. If the paging message is for the terminal in the RRC_INACTIVE state, it is determined that the terminal in the RRC_IDLE state does not need to receive the paging message.

In an example, when the access network device determines to page the terminal C and the terminal D, in other words, the paging message subsequently sent by the access network device is used to page the terminal C and the terminal D, and the terminal C and the terminal D are in the RRC_INACTIVE state, the access network device determines that the first indication information indicates that the terminal in the RRC_IDLE state does not need to receive the paging message.

(2) Initiator of the paging message: which may be the access network device, may be the core network device, or may be the core network device and the access network device If the access network device determines to send the paging message, the initiator of the paging message is the access network device. If the core network device indicates the access network device to send the paging message, the initiator of the paging message is the core network device.

If the access network device determines to send the paging message, but after sending the paging message, the access network device cannot page the terminal in the RRC_INACTIVE state (for example, the terminal in the RRC_INACTIVE state has been out of coverage of the access network device), the access network device needs to send a request to the core network device, and the core network device initiates paging of the terminal. In this case, the core network device and the access network device may be referred to as initiators of the paging message.

In an example, because paging the terminal C and the terminal D is determined by the access network device, the access network device determines that the first indication information indicates that the paging message is initiated by the access network device.

(3) Whether the terminal in the RRC_IDLE state needs to receive the paging message and initiator of the paging message The third case is a combination of the first case and the second case, and details are not described herein again.

In this embodiment of this application, the first indication information may include but is not limited to the following two forms:

In a first form, the first indication information is newly defined information. In an example, the access network device may generate downlink control information (DCI). The DCI is used to indicate whether the terminal in the RRC_IDLE state needs to receive the paging message and/or the initiator of the paging message.

In a second form, the first indication information is carried in a first message, and the first message includes system message update indication information and/or scheduling information of the paging message. The scheduling information includes a coding scheme of a paged terminal and a time-frequency resource that is for the paging message and that is on a downlink shared channel. If the network architecture shown in FIG. 1 is a 5G system, the first message may be short message downlink control information (short message DCI), and the short message DCI is scrambled by using a radio network temporary identifier of the paging message (paging-radio network temporary identity, P-RNTI). Certainly, because the network architecture shown in FIG. 1 may alternatively be for a future-oriented communications technology, a person of ordinary skill in the art may learn that, in the future-oriented communications technology, a name of the first message may not be the short message DCI, but be another name, for example, paging control information or P-RNTI DCI. This is not limited herein. For ease of description, an example in which the first message is the short message DCI is used below to describe a manner in which the first message carries the first indication information.

For a case (1):

Referring to Table 1, the first indication information may be indicated by using one bit in the short message DCI. The bit may be a reserved bit, or may be a bit at another location. This is not limited herein. In Table 1, when a value of the bit is 0, the bit is used to indicate that the terminal in the RRC_IDLE state does not need to receive the paging message. When a value of the bit is 1, the bit is used to indicate that the terminal in the RRC_IDLE state needs to receive the paging message.

TABLE 1

| Bit value | Indicated content |
| --- | --- |
| 0 | The terminal in the RRC_IDLE state does not need to receive the paging message. |

TABLE 1-continued

| Bit value | Indicated content |
| --- | --- |
| 1 | The terminal in the RRC_IDLE state needs to receive the paging message. |

In an example, when the access network device determines to page the terminal C and the terminal D, because the terminal C and the terminal D are in the RRC_INACTIVE state, the access network device determines that the value of the bit that is in the short message DCI and that is used to indicate the first indication information is 0.

For a case (2):

Manner A: Referring to Table 2, the first indication information may be indicated by using two bits in the short message DCI. The two bits may be reserved bits, or may be two bits at another location. This is not limited herein. In Table 2, when values of the two bits are oo, the two bits are used to indicate a reserved state. When values of the two bits are 01, the two bits are used to indicate that the paging message is initiated by the core network device. When values of the two bits are 10, the two bits are used to indicate that the paging message is initiated by the access network device. When values of the two bits are 11, the two bits are used to indicate that the paging message is initiated by the core network device and the access network device.

TABLE 2

| Bit value | Indicated content |
| --- | --- |
| 00 | Reserved state |
| 01 | The paging message is initiated by the access network device. |
| 10 | The paging message is initiated by the core network device. |
| 11 | The paging message is initiated by the core network device and the access network device. |

In an example, because paging the terminal C and the terminal D is determined by the access network device, the access network device determines that the values of the two bits in the short message DCI that are used to indicate the first indication information are 01.

Manner B: When the initiator of the paging message is the core network device, or the initiators of the paging message are the core network and the access network device, both the terminal in the RRC_IDLE state and the terminal in the RRC_INACTIVE state may receive the paging message. Therefore, referring to Table 3, Table 2 may be simplified, and the first indication information is indicated by using one bit in the short message DCI. The bit may be a reserved bit, or may be a bit at another location. This is not limited herein. In Table 3, when a value of the bit is 0, the bit is used to indicate that the paging message is initiated by the access network device. When a value of the bit is 1, the bit is used to indicate that the paging message is initiated by the core network device or is initiated by the core network device and the access network device.

TABLE 3

| Bit value | Indicated content |
| --- | --- |
| 0 | The paging message is initiated by the access network device. |

TABLE 3-continued

| Bit value | Indicated content |
|---|---|
| 1 | The paging message is initiated by the core network device, or is initiated by the core network device and the access network device. |

In an example, because paging the terminal C and the terminal D is determined and sent by the access network device, the access network device determines that the value of the bit that is in the short message DCI and that is used to indicate the first indication information is 0.

It should be noted that, if the first indication information is indicated by using the bit in the short message DCI, each terminal needs to be notified of a location of the bit and a meaning indicated by the bit at the location. For example, the first indication information is indicated by using the reserved bit in the short message DCI. The access network device and the terminal may agree on a meaning of the reserved bit in advance, or the access network device may notify each terminal of a meaning of the reserved bit in the short message DCI by using another message.

The foregoing descriptions of manners of indicating the first indication information should be understood as examples of a manner of indicating the first indication information, and should not be understood as a limitation on the manner of indicating the first indication information.

S24: The access network device sends the first indication information, and the terminal receives the first indication information.

After generating the first indication information, the access network device sends the first indication information to each terminal, so that each terminal can receive the first indication information.

It can be learned from step S23 that the first indication information may include the foregoing two forms. If the first indication information is in the second form, sending the first indication information by the access network device is equivalent to sending the short message DCI by the access network device, that is, the access network device sends the first indication information on a physical downlink control channel (PDCCH).

If the first indication information is in the first form, that is, the first indication information is newly defined information, for example, new DCI, the access network device may also send the first indication information on the PDCCH. In this case, the access network device may send the short message DCI after sending the first indication information. The short message DCI is used to indicate at least one of the system message update indication information, the time-frequency resource that is for the paging message and that is on the downlink shared channel, and the coding scheme of the paged terminal. Alternatively, the access network device may first send the short message DCI, and then send the first indication information; or may simultaneously send the short message DCI and the first indication information.

For ease of description, an example in which the first indication information is in the second form is used in FIG. 2, that is, the first indication information is carried in the short message DCI.

S25: The terminal determines, based on the first indication information, whether to receive the paging message.

A result of determining, by the terminal, whether to receive the paging message varies with a status of the terminal.

In an example, the first indication information is indicated in a manner shown in Table 1 in step S23. The bit used to indicate the first indication information is the reserved bit in the short message DCI, and the value of the reserved bit is 0.

For the terminal in the RRC_IDLE state, for example, the terminal A and the terminal B that are shown in FIG. 1, using the terminal A as an example, the terminal A determines, based on the value of the reserved bit in the short message DCI and a pre-learned correspondence between a reserved bit and indicated content, that the paging message does not need to be received. A determining process performed by the terminal B is the same as that performed by the terminal A, and details are not described herein again.

For the terminal in the RRC_INACTIVE state, for example, the terminal C and the terminal D that are shown in FIG. 1, a same processing method as that used by the terminal A is used to determine that the terminal in the RRC_IDLE state does not need to receive the paging message. Because the terminal C or the terminal D is not in the RRC_IDLE state, the terminal C and the terminal D need to receive the paging message. In this case, the first indication information may be understood as implicitly indicating that the terminal in the RRC_INACTIVE state needs to receive the paging message.

S26: The access network device sends the paging message, and the terminal determining to receive the paging message monitors the paging message.

In this embodiment of this application, the paging message includes an identifier of the at least one paged terminal, and the identifier of the terminal may be a serving temporary mobile subscriber identity (serving-temporary mobile subscriber identity, S-TMSI), a 5G-S-TMSI, or a resume identity-radio network temporary identity (I-RNTI). The 5G-S-TMSI or the S-TMSI may be used to indicate the terminal in the RRC_IDLE state, and the I-RNTI may be used to indicate the terminal in the RRC_INACTIVE state. The identifier of the at least one paged terminal may be referred to as a paging record list.

In an example, an identifier of the terminal C is an I-RNTI_1, and an identifier of the terminal D is an I-RNTI_2. Because the paging message is used to page the terminal C and the terminal D, the identifiers that are of the terminals and that are included in the paging record list of the paging message are the I-RNTI_1 and the I-RNTI_2.

When the terminals, for example, the terminal C and the terminal D, determine that the paging message needs to be received, the terminal C and the terminal D monitor the paging message in a position of the time-frequency resource on which the paging message is located and that is indicated in the short message DCI.

S27: The terminal receives the paging message, and responds to the paging message when the terminal is a terminal paged by using the paging message.

After receiving the paging message, the terminal decodes the paging message by using a coding/decoding scheme indicated in the short message DCI. The terminal obtains the paging record list in the paging message, and performs a matching process of the identifier of the terminal (the process may be understood as a process in which each terminal determines whether the paging record list includes the identifier of the terminal), to determine whether the paging record list carries the identifier of the terminal. When determining that the paging record list carries the identifier of the terminal, the terminal determines that the terminal is a terminal paged by using the paging message, so that the terminal occupies a random access resource located after a moment of receiving the paging message, initiates a random access process to the access network device, and responds to the paging, to set up an RRC connection to the access network device.

In an example, if the terminal C and the terminal D determine that the paging message needs to be received, after the terminal C and the terminal D receive the paging message on the time-frequency resource indicated in the short message DCI, the terminal C and the terminal D search the paging record list in the paging message for whether the identifiers of the terminal C and the terminal D are carried. Because the paging record list includes the I-RNTI_1, the terminal C is a terminal paged by using the paging message, and the terminal C occupies the random access resource located after receiving the paging message, initiates the random access process to the access network device, and sets up the RRC connection to the access network device, to obtain, from the access network device, the service data sent by the core network device to the terminal C. An execution process of the terminal D is the same as that of the terminal C, and details are not described herein again.

In the foregoing technical solution, the terminal may determine, based on the first indication information sent by the network device, whether the paging message is for the terminal in the RRC_IDLE state. If the paging message is for the terminal in the RRC_INACTIVE state, the terminal in the RRC_IDLE state may not need to receive the paging message. This implements RAN paging. In addition, because the terminal in the RRC_IDLE state does not need to receive the RAN paging, power consumption of the terminal in the RRC_IDLE state can be reduced.

Figure 3:
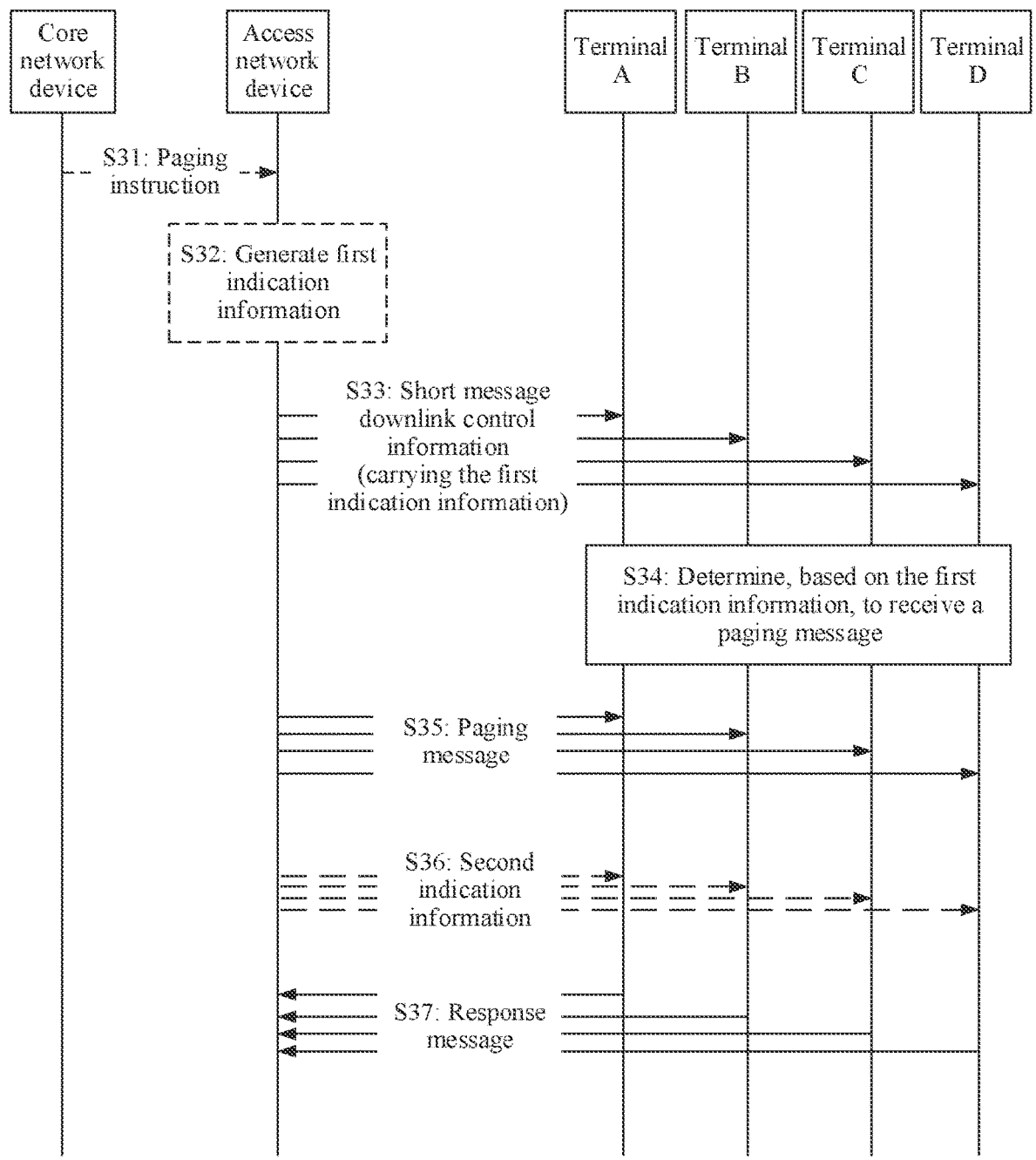
FIG. 3 is a flowchart of another example of a communication method according to an embodiment of this application.

In the foregoing embodiment, the RAN paging is used as an example to describe the method in the embodiments of this application. The following uses CN paging as an example to describe the method in the embodiments of this application. FIG. 3 is a flowchart of a communication method according to an embodiment of this application.

In the following description process, an example in which the method is applied to the network architecture shown in FIG. 1 is used. In other words, a network device described below may be the access network device in the network architecture shown in FIG. 1, and a terminal described below may be one of the terminals in the network architecture shown in FIG. 1. In addition, the method may be performed by two communication apparatuses. Descriptions of the two communication apparatuses are the same as those in the embodiment shown in FIG. 2, and details are not described herein again.

For ease of description, an example in which the method is performed by the access network device and the terminal is used below, in other words, an example in which the first communication apparatus is the access network device and the second communication apparatus is the terminal is used.

S31: A core network device sends a paging instruction, and the access network device receives the paging instruction.

When needing to communicate with at least one terminal, for example, to send service data to the at least one terminal, the core network device needs to determine whether there is a network connection that corresponds to each of the at least one terminal and that is between the core network device and the access network device. When there is no network connection that corresponds to the terminal and that is between the core network device and the access network device, the core network device indicates the access network device connected to a core network in which the core network device is located to initiate paging of the terminal.

In an example, in FIG. 1, the terminal A and the terminal B are in an RRC_IDLE state, the terminal C and the terminal D are in an RRC_INACTIVE state, and the terminal E is in an RRC_CONNECTED state. The core network device needs to send the service data to the terminal A to the terminal D in FIG. 1, but there is no network connection that corresponds to the terminal A and the terminal B and that is between the core network device and the access network device. In this case, the core network device sends, to the access network device connected to the core network in which the core network device is located, namely, the access network device in FIG. 1, the paging instruction for the terminal A to the terminal D, where the instruction carries at least identifiers of the terminal A to the terminal D.

S32: The access network device generates first indication information.

In this embodiment of this application, the first indication information is the same as the first indication information in step S23. Details are not described herein again.

In a first example, the first indication information is indicated by using two reserved bits in short message DCI. Because paging of the terminal A to the terminal D is performed by the access network device according to the paging instruction sent by the core network device, the access network device determines that values of the two reserved bits in the short message DCI are 10.

In addition, it should be noted that step S31 and step S32 are optional steps, in other words, step S31 and step S32 are not mandatory to be performed. For example, the core network device may periodically trigger paging of the terminal.

S33: The access network device sends the first indication information, and the terminal receives the first indication information.

Step S33 is similar to step S24, and details are not described herein again.

S34: The terminal determines, based on the first indication information, whether to receive a paging message.

In an example, the first indication information is indicated by using the two reserved bits in the short message DCI, and the values of the two reserved bits are 10.

For a terminal in the RRC_IDLE state, for example, the terminal A and the terminal B that are shown in FIG. 1, using the terminal A as an example, the terminal A determines, based on the values of the reserved bits in the short message DCI and a pre-learned correspondence between reserved bits and indicated content, that an initiator of the paging message is the core network device. Then, the terminal A determines, based on a preset first correspondence between an initiator and whether to receive the paging message, whether the paging message needs to be received. Table 4 lists an example of the preset first correspondence between an initiator and whether to receive the paging message. In Table 4, when the initiator of the paging message is the access network device, the terminal determines not to receive the paging message. When the initiator of the paging message is the core network device or is the core network device and the access network device, the terminal determines to receive the paging message. When the terminal A determines that the initiator of the paging message is the core network device, the terminal A determines, based on the first correspondence shown in Table 4, that the paging message needs to be received. A determining process performed by the terminal B is the same as that performed by the terminal A, and details are not described herein again.

TABLE 4

| Initiator | Whether to receive the paging message |
|---|---|
| Access network device | No |
| Core network device | Yes |
| Core network device and access network device | Yes |

For a terminal in the RRC_INACTIVE state, for example, the terminal C and the terminal D that are shown in FIG. 1, using the terminal C as an example, the terminal C determines, based on the values of the reserved bits in the short message DCI and a pre-learned correspondence between reserved bits and indicated content, that an initiator of the paging message is the core network device. Then, the terminal C determines, based on a preset second correspondence between an initiator and whether to receive the paging message, whether the paging message needs to be received. Table 5 lists a first example of the preset second correspondence between an initiator and whether to receive the paging message. In Table 5, when the initiator of the paging message is the access network device or is the core network device and the access network device, the terminal determines to receive the paging message. When the initiator of the paging message is the core network device, the terminal may not determine to receive the paging message. When the terminal C determines that the initiator of the paging message is the core network device, the terminal C determines, based on the correspondence shown in Table 5, that the paging message does not need to be received. A determining process performed by the terminal D is the same as that performed by the terminal C, and details are not described herein again.

TABLE 5

| Initiator | Whether to receive the paging message |
|---|---|
| Access network device | Yes |
| Core network device | No |
| Core network device and access network device | Yes |

Table 6 lists a second example of the second correspondence. In Table 6, the terminal determines, regardless of a device that initiates the paging message, to receive the paging message. That is, the terminal in the RRC_INACTIVE state needs to receive CN paging and RAN paging. In this case, both the terminal C and the terminal D determine that the paging message needs to be received.

TABLE 6

| Initiator | Whether to receive the paging message |
|---|---|
| Access network device | Yes |
| Core network device | Yes |
| Core network device and access network device | Yes |

It should be noted that the foregoing manner is merely an example, and should not be construed as a limitation on this embodiment of this application. In addition, when it is determined, in the foregoing manner, whether to receive the paging message, because each terminal may be in the RRC_INACTIVE state or the RRC_IDLE state, each terminal needs to store two preset correspondences between an initiator and whether to receive the paging message, for example, the first correspondence that is for the terminal in the RRC_IDLE state and that is shown in Table 4 and the second correspondence that is for the terminal in the RRC_INACTIVE state and that is shown in Table 5, or the first correspondence that is for the terminal in the RRC_IDLE state and that is shown in Table 4 and the second correspondence that is for the terminal in the RRC_INACTIVE state and that is shown in Table 6. In this way, the terminal may determine, based on a status of the terminal, which correspondence is to be used.

In an example, an example in which each of the terminal A to the terminal D stores the first correspondence that is for the terminal in the RRC_IDLE state and that is shown in Table 4 and the second correspondence that is for the terminal in the RRC_INACTIVE state and that is shown in Table 6 is used below. In this case, all the terminal A to the terminal D determine that the paging message needs to be received.

S35: The access network device sends the paging message, and the terminal determining to receive the paging message monitors the paging message.

In this embodiment of this application, content included in the paging message may be in the following seven cases:

Case a: The paging message includes an identifier of the at least one terminal, and the identifier of the at least one terminal includes at least one first identifier of at least one terminal in the RRC_IDLE state and at least one second identifier of at least one terminal in the RRC_INACTIVE state. The identifier of the at least one terminal forms a paging record list, and the at least one first identifier and the at least one second identifier are randomly arranged in the paging record list.

Figure 4:
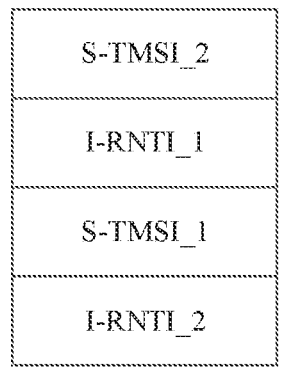
FIG. 4 is a schematic diagram of an arrangement manner of at least one first identifier and at least one second identifier in a paging record list according to an embodiment of this application.

In an example, referring to FIG. 4, the at least one first identifier may be the identifier of the terminal A and the identifier of the terminal B, and the at least one second identifier may be the identifier of the terminal C and the identifier of the terminal D. The identifier of the terminal A is an S-TMSI_1, the identifier of the terminal B is an S-TMSI_2, the identifier of the terminal C is an I-RNTI_1, and the identifier of the terminal D is an I-RNTI_2. In FIG. 4, the at least one first identifier and the at least one second identifier are alternately arranged.

Case b: The paging message includes an identifier of the at least one terminal, and the identifier of the at least one terminal includes at least one first identifier of at least one terminal in the RRC_IDLE state and at least one second identifier of at least one terminal in the RRC_INACTIVE state. The at least one first identifier and the at least one second identifier are arranged according to a preset rule. The preset rule is: The identifier of the at least one terminal is located in one list, and each of the at least one first identifier is located before any one of the at least one second identifier. That is, the identifier of the at least one terminal forms a paging record list, and the identifier of the terminal in the RRC_IDLE state is located before the identifier of the terminal in the RRC_INACTIVE state.

Figure 5:
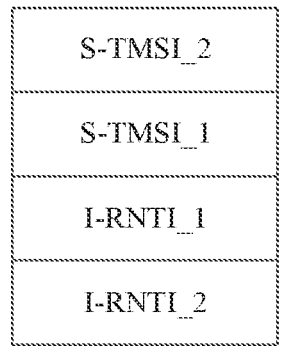
FIG. 5 is a schematic diagram of another arrangement manner of at least one first identifier and at least one second identifier in a paging record list according to an embodiment of this application.

In an example, referring to FIG. 5, the at least one first identifier may be the identifier of the terminal A and the identifier of the terminal B, and the at least one second identifier may be the identifier of the terminal C and the identifier of the terminal D. The identifier of the terminal A is an S-TMSI_1, the identifier of the terminal B is an S-TMSI_2, the identifier of the terminal C is an I-RNTI_1, and the identifier of the terminal D is an I-RNTI_2. The S-TMSI_1 and the S-TMSI_2 are located before the I-RNTI_1 and the I-RNTI_2.

Case c: The paging message includes an identifier of the at least one terminal, and the identifier of the at least one terminal includes at least one first identifier of at least one terminal in the RRC_IDLE state and at least one second identifier of at least one terminal in the RRC_INACTIVE state. The at least one first identifier and the at least one second identifier are arranged according to a preset rule. The preset rule is: The identifier of the at least one terminal is located in one list, and each of the at least one second identifier is located before any one of the at least one first identifier. That is, the identifier of the at least one terminal forms a paging record list, and the identifier of the terminal in the RRC_INACTIVE state is located before the identifier of the terminal in the RRC_IDLE state.

Figure 6:
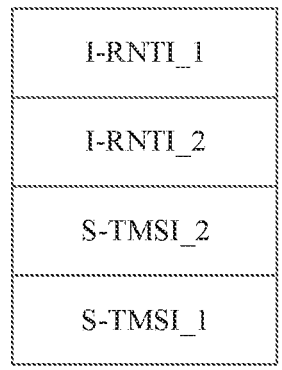
FIG. 6 is a schematic diagram of another arrangement manner of at least one first identifier and at least one second identifier in a paging record list according to an embodiment of this application.

In an example, referring to FIG. 6, the at least one first identifier may be the identifier of the terminal A and the identifier of the terminal B, and the at least one second identifier may be the identifier of the terminal C and the identifier of the terminal D. The identifier of the terminal A is an S-TMSI_1, the identifier of the terminal B is an S-TMSI_2, the identifier of the terminal C is an I-RNTI_1, and the identifier of the terminal D is an I-RNTI_2. The I-RNTI_1 and the I-RNTI_2 are located before the S-TMSI_1 and the S-TMSI_2.

Case d: The paging message includes an identifier of the at least one terminal, and the identifier of the at least one terminal includes at least one first identifier of at least one terminal in the RRC_IDLE state and at least one second identifier of at least one terminal in the RRC_INACTIVE state. The at least one first identifier and the at least one second identifier are arranged according to a preset rule. The preset rule is: The identifier of the at least one terminal is classified into two lists, the first list in the two lists includes the at least one first identifier, and the second list in the two lists includes the at least one second identifier. That is, the paging message includes two paging record lists. One paging record list includes the paged terminal in the RRC_IDLE state, and the other paging record list includes the paged terminal in the RRC_INACTIVE state.

Figure 7:
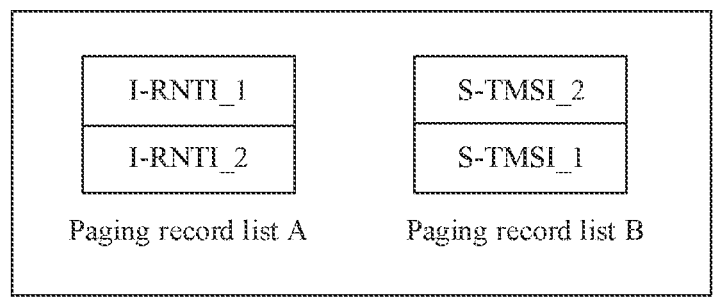
FIG. 7 is a schematic diagram of another arrangement manner of at least one first identifier and at least one second identifier in a paging record list according to an embodiment of this application.

In an example, referring to FIG. 7, the at least one first identifier may be the identifier of the terminal A and the identifier of the terminal B, and the at least one second identifier may be the identifier of the terminal C and the identifier of the terminal D. The identifier of the terminal A is an S-TMSI_1, the identifier of the terminal B is an S-TMSI_2, the identifier of the terminal C is an I-RNTI_1, and the identifier of the terminal D is an I-RNTI_2. A paging record list A includes the I-RNTI_1 and the I-RNTI_2, and a paging record list B includes the S-TMSI_1 and the S-TMSI_2.

Case e: The paging message includes an identifier of the at least one terminal and an arrangement rule of the identifier of the at least one terminal, the arrangement rule is the same as the preset rule in the case b, and the identifier of the at least one terminal is arranged according to the arrangement rule.

Case f: The paging message includes an identifier of the at least one terminal and an arrangement rule of the identifier of the at least one terminal, the arrangement rule is the same as the preset rule in the case c, and the identifier of the at least one terminal is arranged according to the arrangement rule.

Case g: The paging message includes an identifier of the at least one terminal and an arrangement rule of the identifier of the at least one terminal, the arrangement rule is the same as the preset rule in the case d, and the identifier of the at least one terminal is arranged according to the arrangement rule.

The case e to the case g are similar to the case b to the case d, and details are not described herein again.

Certainly, the paging message may further include other content. This is not limited herein.

When the terminal, for example, any one of the terminal A to the terminal D, determines that the paging message needs to be received, the terminal monitors the paging message in a position of a time-frequency resource on which the paging message is located and that is indicated in the short message DCI.

S36: The access network device sends second indication information, and the terminal receives the second indication information.

In this embodiment of this application, the second indication information is used to indicate an arrangement rule of the at least one first identifier and the at least one second identifier. In other words, if the paging message is in one of the case b to the case d in step S35, the access network device further needs to indicate the preset rule to the terminal. For example, when the paging message is in the case b in step S35, the second indication information is used to indicate that the identifier of the at least one terminal is located in one list and each of the at least one first identifier is located before any one of the at least one second identifier. When the paging message is in the case c or the case d in step S35, for content indicated in the second indication information, refer to the descriptions of the preset rule in the corresponding case. Details are not described herein again.

In this embodiment of this application, the second indication information includes but is not limited to at least one of the following information:

(1) Offset Between the $1^{st}$ Second Identifier and the $1^{st}$ First Identifier in the One List In an example, when the paging record list included in the paging message is shown in FIG. 4, the second indication information may indicate that the offset is 2. When the paging record list included in the paging message is shown in FIG. 5, the second indication information may indicate that the offset is −2.

In another example, when the paging record list included in the paging message is shown in FIG. 4, the second indication information may indicate that the offset is greater than 0, for example, is 1. This indicates that in the paging record list, the second identifier is after the first identifier. When the paging record list included in the paging message is shown in FIG. 5, the second indication information may indicate that the offset is less than 0, for example, is −1. This indicates that in the paging record list, the second identifier is before the first identifier.

(2) Mapping Relationship Between the First List in the Two Lists and the at Least One First Identifier In an example, when the paging record list included in the paging message is shown in FIG. 5, the second indication information may indicate that the paging record list A corresponds to the at least one first identifier.

(3) Mapping Relationship Between the Second List in the Two Lists and the at Least One Second Identifier In an example, when the paging record list included in the paging message is shown in FIG. 5, the second indication information may indicate that the paging record list B corresponds to the at least one second identifier.

It should be noted that step S36 is performed only when the paging message is in any one of the case b to the case d in step S35, and is shown in dashed lines in FIG. 3. In addition, if step S36 is performed, step S36 may be performed before step S35, or step S36 and step S35 may be simultaneously performed.

S37: The terminal receives the paging message, and responds to the paging message when the terminal is a terminal paged by using the paging message.

After receiving the paging message, the terminal decodes the paging message by using a coding/decoding scheme indicated in the short message DCI. The terminal obtains the paging record list in the paging message, and performs a matching process of the identifier of the terminal, to determine whether the paging record list carries the identifier of the terminal. In this embodiment of this application, the matching process performed by the terminal on the identifier of the terminal varies with the content included in the paging message.

Specifically, for the paging message in the case a, after obtaining the paging record list from the paging message, the terminal performs the matching process of the identifier of the terminal in a default manner (a front-to-back manner or a back-to-front manner). In this case, step S37 is the same as step S27.

For the paging message in the case b to the case g, after obtaining the paging record list from the paging message, the terminal may perform the matching process of the identifier of the terminal according to the preset rule.

In an example, the preset rule is the rule in the case b. Because the preset rule is that the identifier of the terminal in the RRC_IDLE state is located before the identifier of the terminal in the RRC_INACTIVE state, the terminal (for example, the terminal A and the terminal B) in the RRC_IDLE state may perform the matching process of the identifier of the terminal in a front-to-back sequence after receiving the paging message, and the terminal (for example, the terminal C and the terminal D) in the RRC_INACTIVE state may perform the matching process of the identifier of the terminal in a back-to-front sequence after receiving the paging message, so that duration consumed for performing the matching process of the identifier of the terminal can be reduced, thereby improving a response speed of the terminal to the paging message.

In another example, the preset rule is the rule in the case d. The terminal in the RRC_IDLE state may perform the matching process of the identifier of the terminal only for the paging record list A after receiving the paging message, and the terminal in the RRC_INACTIVE state may perform the matching process of the identifier of the terminal only for the paging record list B after receiving the paging message, so that duration consumed for performing the matching process of the identifier of the terminal can be reduced, thereby improving a response speed of the terminal to the paging message.

When it is determined that the identifier of the terminal is carried, it is determined that the terminal is a terminal paged by using the paging message, so that the terminal occupies a random access resource located after a moment of receiving the paging message, initiates a random access process to the access network device, and responds to the paging, to set up an RRC connection to the access network device.

In the foregoing technical solution, the terminal may determine, based on the first indication information sent by the access network device, whether the paging message is for the terminal in the RRC_IDLE state. The terminal in the RRC_IDLE state receives the paging message only when the paging message is for the terminal in the RRC_IDLE state. This implements the CN paging.

It should be noted that, in the embodiment shown in FIG. 2 or FIG. 3, the core network device or the access network device is triggered by using the service data to send the paging message to the terminal, but there are a plurality of reasons for triggering the core network device or the access network device to send the paging message to the terminal. For example, the terminal in the RRC_IDLE state or the terminal in the RRC_INACTIVE state may be periodically paged, or paging is triggered by a change of a system message or is actively triggered by the access network device. For example, an access network device side expects to release context information of the terminal, or requires the terminal to report location information. The method in this embodiment of this application is also applicable to a case in which the core network device or the access network device is triggered by another reason to send the paging message to the terminal. This is not limited herein.

In addition, it should be noted that, in the embodiment shown in FIG. 2 or FIG. 3, only the process of processing the paging message by the terminal in the RRC_IDLE state or the terminal in the RRC_INACTIVE state is described. A terminal in the RRC_CONNECTED state may also receive the paging message. For example, the paging message is triggered by the change of the system message. For a process of processing the paging message by the terminal in the RRC_CONNECTED state, refer to the process performed by the terminal in the RRC_INACTIVE state. Details are not described herein again.

In the foregoing embodiments provided in this application, the method provided in the embodiments of this application is described separately from perspectives of the core network device, the access network device, the at least one terminal, and interaction among the core network device, the access network device, and the at least one terminal. To implement functions in the method provided in the foregoing embodiments of this application, the core network device, the access network device, and the at least one terminal each may include a hardware structure and/or a software module, and implement the foregoing functions by using the hardware structure, the software module, or a combination of the hardware structure and the software module. Whether a specific function in the foregoing functions is performed by using the hardware structure, the software module, or the combination of the hardware structure and the software module depends on a specific application and a design constraint of the technical solutions.

Figure 8:
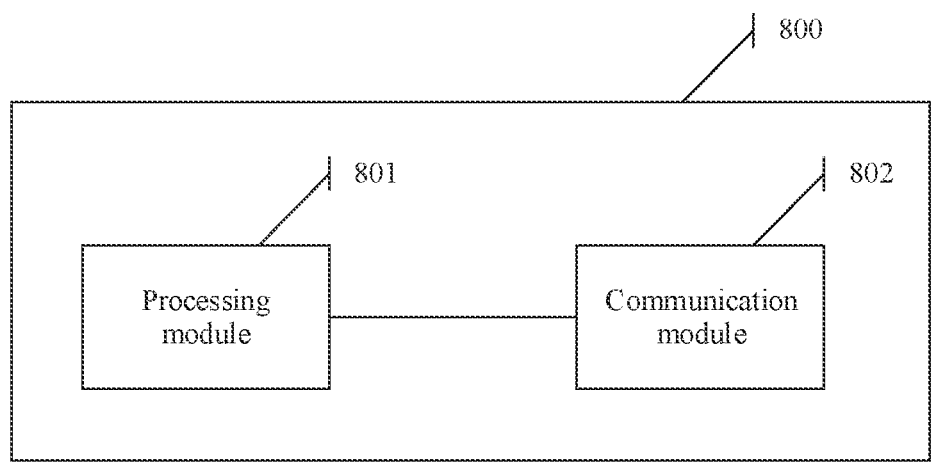
FIG. 8 is a schematic structural diagram of a communication apparatus according to an embodiment of this application.

FIG. 8 is a schematic structural diagram of a communication apparatus 800. The communication apparatus 800 may be a network device, and can implement functions of the access network device in the method provided in the embodiments of this application. The communication apparatus 800 may alternatively be an apparatus that can support the access network device in implementing functions of the access network device in the method provided in the embodiments of this application. The communication apparatus 800 may be a hardware structure, a software module, or a combination of a hardware structure and a software module. The communication apparatus 800 may be implemented by a chip system. In this embodiment of this application, the chip system may include a chip, or may include a chip and another discrete component.

The communication apparatus 800 may include a processing module 801 and a communication module 802.

The processing module 801 may be configured to perform step S22 and step S23 in the embodiment shown in FIG. 2, or configured to perform step S32 in the embodiment shown in FIG. 3, and/or configured to support another process of the technology described in this specification. The communication module 802 is used for communication between the communication apparatus 800 and another module, and may be a circuit, a component, an interface, a bus, a software module, a transceiver, or any other apparatus that can implement the communication.

The communication module 802 may be configured to perform step S21, step S24, step S26, and step S27 in the embodiment shown in FIG. 2, or configured to perform step S31, step S33, step S35, step S36, and step S37 in the embodiment shown in FIG. 3, and/or configured to support another process of the technology described in this specification.

All related content of the steps in the foregoing method embodiments may be cited in function descriptions of corresponding functional modules. Details are not described herein again.

Figure 9:
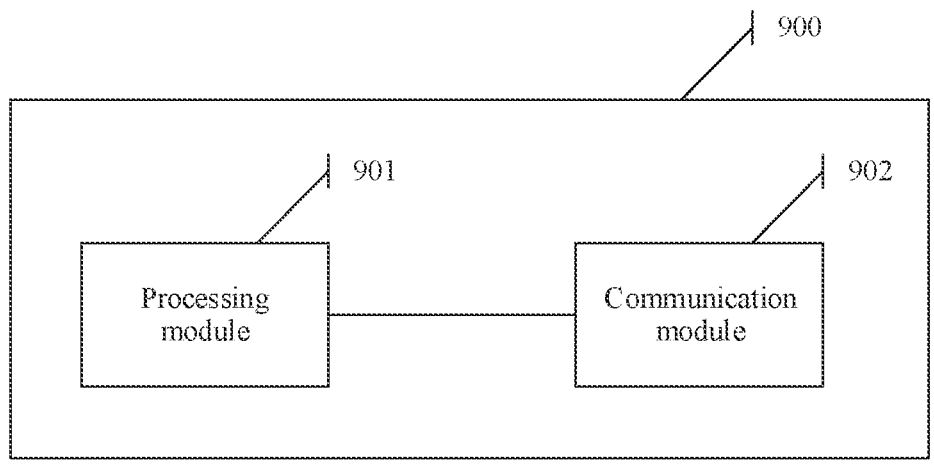
FIG. 9 is a schematic structural diagram of another communication apparatus according to an embodiment of this application.

FIG. 9 is a schematic structural diagram of a communication apparatus 900. The communication apparatus 900 may be a terminal, and can implement functions of the terminal in the method provided in the embodiments of this application. The communication apparatus 900 may alternatively be an apparatus that can support the terminal in implementing functions of the terminal in the method provided in the embodiments of this application. The communication apparatus 900 may be a hardware structure, a software module, or a combination of a hardware structure and a software module. The communication apparatus 900 may be implemented by a chip system. In this embodiment of this application, the chip system may include a chip, or may include a chip and another discrete component.

The communication apparatus 900 may include a processing module 901 and a communication module 902.

The processing module 901 may be configured to perform step S25 in the embodiment shown in FIG. 2, or configured to perform step S34 in the embodiment shown in FIG. 3, and/or configured to support another process of the technology described in this specification.

The communication module 902 may be configured to perform step S24, step S26, and step S27 in the embodiment shown in FIG. 2, or configured to perform step S33, step S35, step S36, and step S37 in the embodiment shown in FIG. 3, and/or configured to support another process of the technology described in this specification. The communication module 902 is used for communication between the communication apparatus 900 and another module, and may be a circuit, a component, an interface, a bus, a software module, a transceiver, or any other apparatus that can implement the communication.

All related content of the steps in the foregoing method embodiments may be cited in function descriptions of corresponding functional modules. Details are not described herein again.

Division into modules in the embodiments of this application is an example, is only division into logical functions, and may be other division in an actual implementation. In addition, the functional modules in the embodiments of this application may be integrated into one processor, or may exist alone physically, or two or more modules may be integrated into one module. The integrated module may be implemented by using hardware, or may be implemented by using a software functional module.

Figure 10:
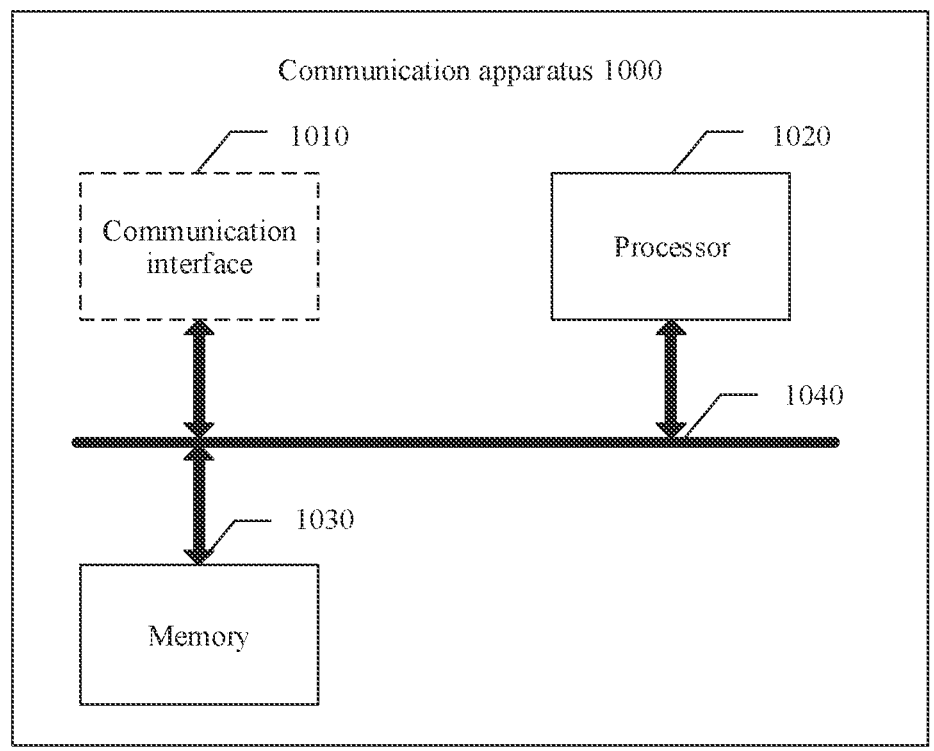
FIG. 10 is a schematic structural diagram of another communication apparatus according to an embodiment of this application.

FIG. 10 shows a communication apparatus 1000 according to an embodiment of this application. The communication apparatus 1000 may be the access network device in the embodiment shown in FIG. 2 or FIG. 3, and can implement functions of the access network device in the method provided in the embodiments of this application. The communication apparatus 1000 may alternatively be an apparatus that can support the access network device in implementing functions of the access network device in the method provided in the embodiments of this application. The communication apparatus 1000 may be a chip system. In this embodiment of this application, the chip system may include a chip, or may include a chip and another discrete component.

The communication apparatus 1000 includes at least one processor 1020, configured to implement or support the communication apparatus 1000 in implementing the functions of the access network device in the method provided in the embodiments of this application. For example, the processor 1020 may generate first indication information. For details, refer to the detailed descriptions in the method examples, and the details are not described herein again.

The communication apparatus 1000 may further include at least one memory 1030, configured to store program instructions and/or data. The memory 1030 is coupled to the processor 1020. Coupling in this embodiment of this application is an indirect coupling or a communication connection between apparatuses, units, or modules, may be in an electrical, a mechanical, or another form, and is used for information exchange between the apparatuses, the units, or the modules. The processor 1020 may cooperate with the memory 1030. The processor 1020 may execute the program instructions stored in the memory 1030. At least one of the at least one memory may be included in the processor.

The communication apparatus 1000 may further include a communication interface 1010, configured to communicate with another device through a transmission medium, so that an apparatus in the communication apparatus 1000 can communicate with the another device. For example, the another device may be a terminal. The processor 1020 may send and receive data through the communication interface 1010.

In this embodiment of this application, a specific connection medium among the communication interface 1010, the processor 1020, and the memory 1030 is not limited. In this embodiment of this application, the memory 1030, the processor 1020, and the communication interface 1010 are connected by using a bus 1040 in FIG. 10, and the bus is represented by a thick line in FIG. 10. A connection manner between other components is schematically described, and is not limited thereto. The bus may be classified into an address bus, a data bus, a control bus, and the like. For ease of representation, only one thick line is used to represent the bus in FIG. 10, but this does not mean that there is only one bus or only one type of bus.

In this embodiment of this application, the processor 1020 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor, any conventional processor, or the like. The steps of the method disclosed with reference to the embodiments of this application may be directly performed by a hardware processor, or may be performed by using a combination of hardware in the processor and a software module.

In this embodiment of this application, the memory 1030 may be a non-volatile memory, such as a hard disk drive (HDD) or a solid-state drive (SSD), or may be a volatile memory, such as a random access memory (RAM). The memory is any other medium that can be used to carry or store expected program code in a form of instructions or a data structure and that can be accessed by a computer. However, this is not limited thereto. The memory in this embodiment of this application may alternatively be a circuit or any other apparatus that can implement a storage function, and is configured to store the program instructions and/or data.

Figure 11:
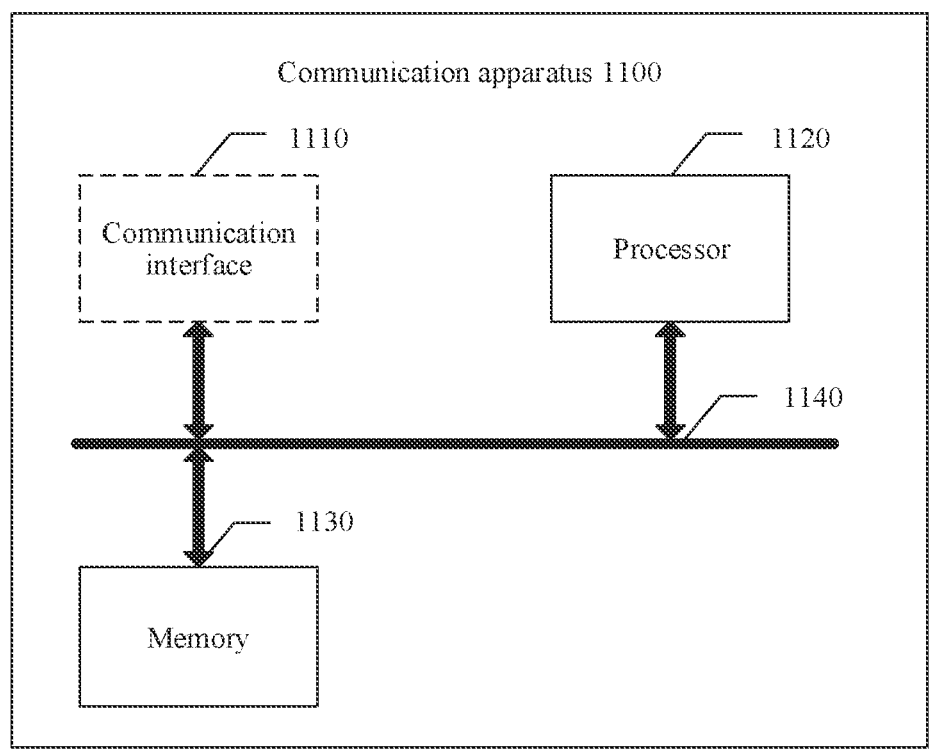
FIG. 11 is a schematic structural diagram of another communication apparatus according to an embodiment of this application.

FIG. 11 shows a communication apparatus 1100 according to an embodiment of this application. The communication apparatus 1100 may be a terminal, and can implement functions of the terminal in the method provided in the embodiments of this application. The communication apparatus 1100 may alternatively be an apparatus that can support the terminal in implementing functions of the terminal in the method provided in the embodiments of this application. The communication apparatus 1100 may be a chip system. In this embodiment of this application, the chip system may include a chip, or may include a chip and another discrete component.

The communication apparatus 1100 includes at least one processor 1120, configured to implement or support the communication apparatus 1100 in implementing the functions of the terminal in the method provided in the embodiments of this application. For example, the processor 1120 may determine, based on first indication information, not to receive a paging message. For details, refer to the detailed descriptions in the method examples, and the details are not described herein again.

The communication apparatus 1100 may further include at least one memory 1130, configured to store program instructions and/or data. The memory 1130 is coupled to the processor 1120. Coupling in this embodiment of this application is an indirect coupling or a communication connection between apparatuses, units, or modules, may be in an electrical, a mechanical, or another form, and is used for information exchange between the apparatuses, the units, or the modules. The processor 1120 may cooperate with the memory 1130. The processor 1120 may execute the program instructions stored in the memory 1130. At least one of the at least one memory may be included in the processor.

The communication apparatus 1100 may further include a communication interface 1110, configured to communicate with another device through a transmission medium, so that an apparatus in the apparatus 1100 can communicate with the another device. For example, the another device may be a network device. The processor 1120 may send and receive data through the communication interface 1110.

In this embodiment of this application, a specific connection medium among the communication interface 1110, the processor 1120, and the memory 1130 is not limited. In this embodiment of this application, the memory 1130, the processor 1120, and the communication interface 1110 are connected by using a bus 1140 in FIG. 11, and the bus is represented by a thick line in FIG. 11. A connection manner between other components is schematically described, and is not limited thereto. The bus may be classified into an address bus, a data bus, a control bus, and the like. For ease of representation, only one thick line is used to represent the bus in FIG. 11, but this does not mean that there is only one bus or only one type of bus.

In this embodiment of this application, the processor 1120 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor, any conventional processor, or the like. The steps of the method disclosed with reference to the embodiments of this application may be directly performed by a hardware processor, or may be performed by using a combination of hardware in the processor and a software module.

In this embodiment of this application, the memory 1130 may be a non-volatile memory, such as a hard disk drive (HDD) or a solid-state drive (SSD), or may be a volatile memory, such as a random access memory (random-access memory, RAM). The memory is any other medium that can be used to carry or store expected program code in a form of instructions or a data structure and that can be accessed by a computer. However, this is not limited thereto. The memory in this embodiment of this application may alternatively be a circuit or any other apparatus that can implement a storage function, and is configured to store the program instructions and/or data.

An embodiment of this application further provides a communication apparatus, and the communication apparatus may be a terminal or a circuit. The communication apparatus may be configured to perform actions performed by the terminal in the foregoing method embodiments.

Figure 12:
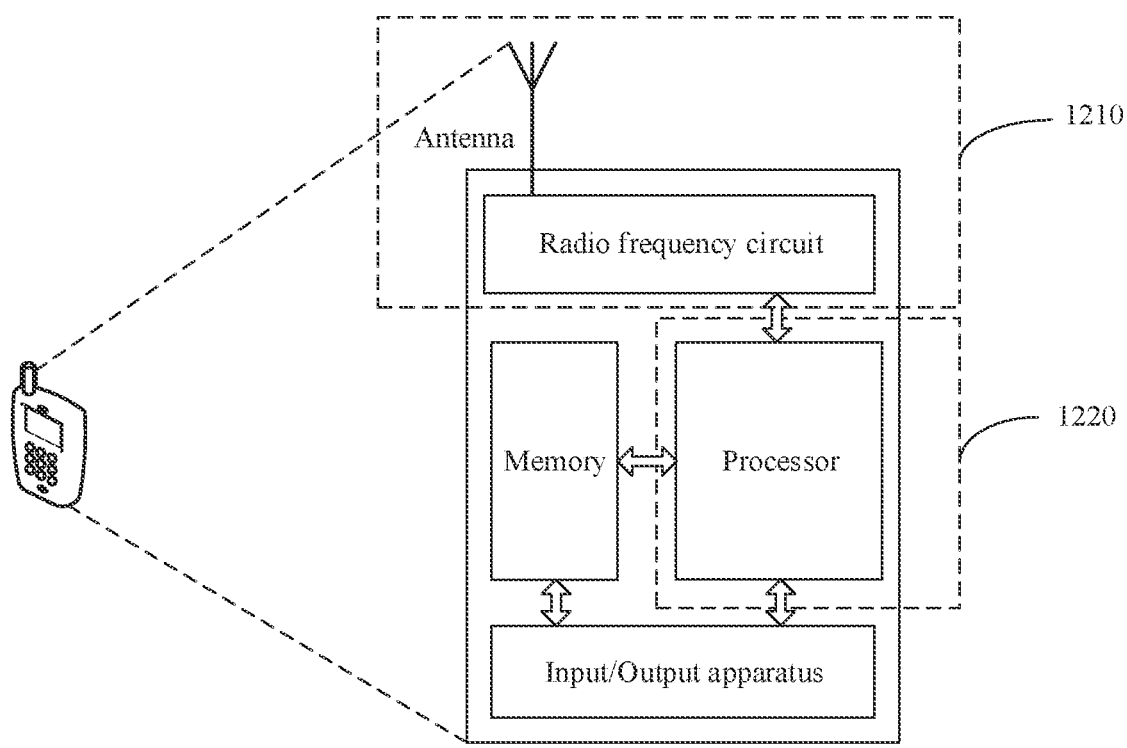
FIG. 12 is a schematic block diagram of a communication apparatus according to an embodiment of this application.

When the communication apparatus is a terminal, FIG. 12 is a simplified schematic structural diagram of a terminal. For ease of understanding and illustration, an example in which the terminal is a mobile phone is used in FIG. 12. As shown in FIG. 12, the terminal includes a processor, a memory, a radio frequency circuit, an antenna, and an input/output apparatus. The processor is mainly configured to: process a communication protocol and communication data, control the terminal, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, such as a touchscreen, a display, or a keyboard, is mainly configured to: receive data entered by a user, and output data to the user. It should be noted that some types of terminals may not have an input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal through the antenna in an electromagnetic wave form. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal, and the processor that has a processing function may be considered as a processing unit of the terminal. As shown in FIG. 12, the terminal includes a transceiver unit 1210 and a processing unit 1220. The transceiver unit may also be referred to as a transceiver, a transceiver apparatus, or the like. The processing unit may also be referred to as a processor, a processing board, a processing module, a processing apparatus, or the like. Optionally, a component for implementing a receiving function in the transceiver unit 1210 may be considered as a receiving unit, and a component for implementing a sending function in the transceiver unit 1210 may be considered as a sending unit. That is, the transceiver unit 1210 includes the receiving unit and the sending unit. The transceiver unit may also be sometimes referred to as a transceiver, a transceiver circuit, or the like. The receiving unit may also be sometimes referred to as a receiver, a receiver circuit, or the like. The sending unit may also be sometimes referred to as a transmitter, a transmitter circuit, or the like.

It should be understood that the transceiver unit 1210 is configured to perform the sending operation and the receiving operation on a terminal side in the foregoing method embodiments, and the processing unit 1220 is configured to perform an operation other than the receiving/sending operation of the terminal in the foregoing method embodiments.

For example, in an implementation, the transceiver unit 1210 is configured to perform the receiving operation on the terminal side in step S24 in FIG. 2, and/or the transceiver unit 1210 is further configured to perform another receiving/sending step on the terminal side in the embodiments of this application. The processing unit 1220 is configured to perform step S25 in FIG. 2, and/or the processing unit 1220 is further configured to perform another processing step on the terminal side in the embodiments of this application.

For another example, in another implementation, the transceiver unit 1210 is configured to perform the receiving operation on the terminal side in step S33, step S35, and step S36 in FIG. 3 or the sending operation on the terminal side in step S37, and/or the transceiver unit 1210 is further configured to perform another receiving/sending step on the terminal side in the embodiments of this application. The processing unit 1220 is configured to perform step S34 in FIG. 3, and/or the processing unit 1220 is further configured to perform another processing step on the terminal side in the embodiments of this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 13:
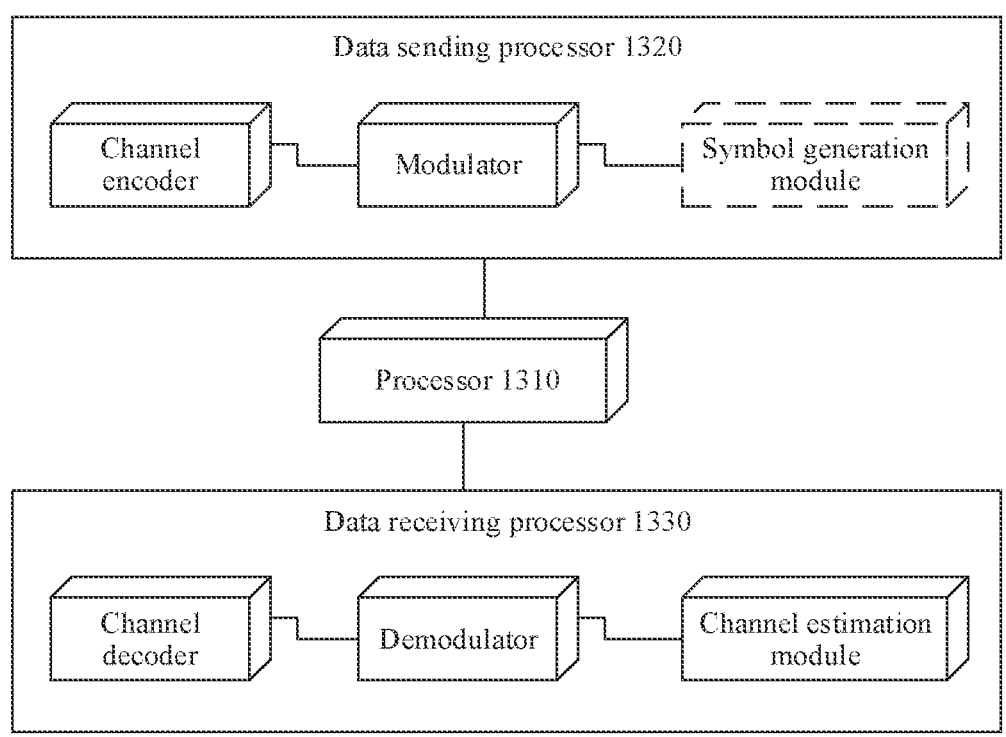
FIG. 13 is another schematic block diagram of a communication apparatus according to an embodiment of this application.

When the communication apparatus in this embodiment is a terminal, refer to a device shown in FIG. 13. In an example, the device can implement a function similar to the function of the processor 1120 in FIG. 11. In FIG. 13, the device includes a processor 1310, a data sending processor 1320, and a data receiving processor 1330. The processing module 901 in the foregoing embodiment may be the processor 1310 in FIG. 13, and completes a corresponding function. The transceiver module 902 in the foregoing embodiment may be the data sending processor 1320 and/or the data receiving processor 1330 in FIG. 13. Although FIG. 13 shows a channel encoder and a channel decoder, it may be understood that these modules are merely examples, and do not constitute a limitation on this embodiment.

Figure 14:
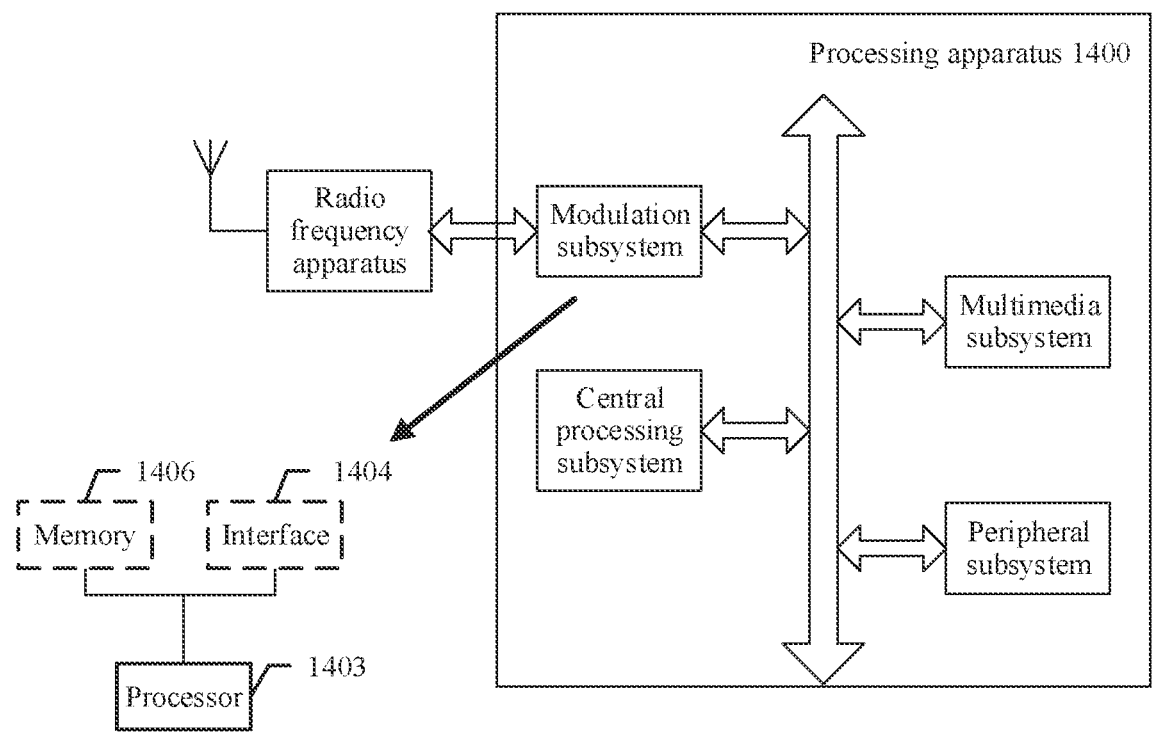
FIG. 14 is still another schematic block diagram of a communication apparatus according to an embodiment of this application.

FIG. 14 shows another form of this embodiment. A processing apparatus 1400 includes modules such as a modulation subsystem, a central processing subsystem, and a peripheral subsystem. The communication apparatus in the embodiments may be used as the modulation subsystem in the processing apparatus. Specifically, the modulation subsystem may include a processor 1403 and an interface 1404. The processor 1403 implements a function of the processing module 901, and the interface 1404 implements a function of the transceiver module 902. In another variation, the modulation subsystem includes a memory 1406, a processor 1403, and a program that is stored in the memory 1406 and that can be run on the processor. When executing the program, the processor 1403 implements the method on the terminal side in the foregoing method embodiments. It should be noted that the memory 1406 may be non-volatile or volatile. The memory 1406 may be located in the modulation subsystem, or may be located in the processing apparatus 1400, provided that the memory 1406 can be connected to the processor 1403.

In another form of this embodiment, a computer-readable storage medium is provided. The computer-readable storage medium stores instructions. When the instructions are executed, the method on the terminal side in the foregoing method embodiments is performed.

In another form of this embodiment, a computer program product that includes instructions is provided. When the instructions are executed, the method on the terminal side in the foregoing method embodiments is performed.

Figure 15:
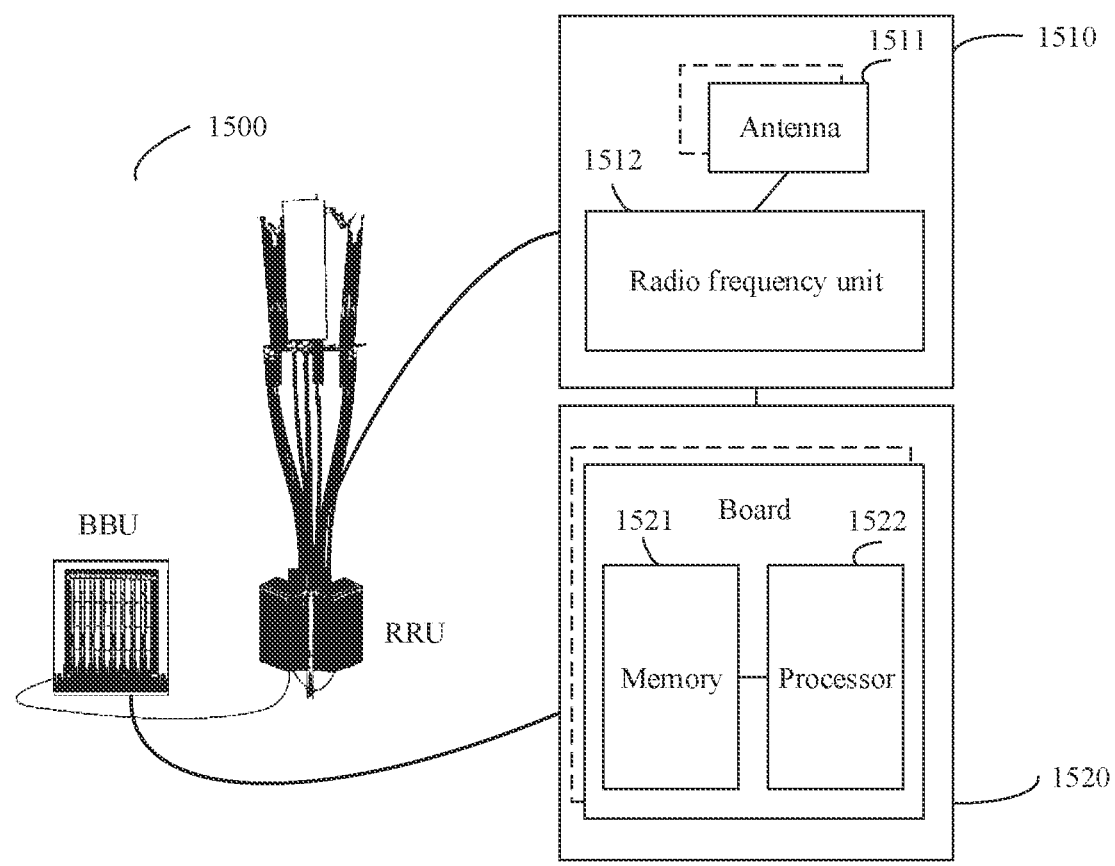
FIG. 15 is still another schematic block diagram of a communication apparatus according to an embodiment of this application.

When the apparatus in this embodiment is an access network device, the access network device may be shown in FIG. 15. An apparatus 1500 includes one or more radio frequency units, such as a remote radio unit (RRU) 1510 and one or more baseband units (BBU) (which may also be referred to as digital units, DUs) 1520. The RRU 1510 may be referred to as a transceiver module, and corresponds to the transceiver module 902 in FIG. 9. Optionally, the transceiver module may also be referred to as a transceiver, a transceiver circuit, or the like, and may include at least one antenna 1511 and a radio frequency unit 1512. The RRU 1510 is mainly configured to: send and receive a radio frequency signal, and perform conversion between the radio frequency signal and a baseband signal. For example, the RRU 1510 is configured to send indication information to a terminal. The BBU 1510 is mainly configured to: perform baseband processing, control the access network device, and so on. The RRU 1510 and the BBU 1520 may be physically disposed together; or may be physically disposed separately, in other words, in a distributed base station.

The BBU 1520 is a control center of the base station, and may also be referred to as a processing module. The BBU 1520 may correspond to the processing module 901 in FIG. 9, and is mainly configured to implement a baseband processing function such as channel coding, multiplexing, modulation, or spreading. For example, the BBU (processing module) may be configured to control the base station to perform an operation procedure related to the network device in the foregoing method embodiments, for example, generate the foregoing indication information.

In an example, the BBU 1520 may include one or more boards, and a plurality of boards may jointly support a radio access network (such as an LTE network) having a single access standard, or may separately support radio access networks (such as an LTE network, a 5G network, or another network) having different access standards. The BBU 1520 further includes a memory 1521 and a processor 1522. The memory 1521 is configured to store necessary instructions and data. The processor 1522 is configured to control the base station to perform a necessary action, for example, configured to control the base station to perform the operation procedure related to the network device in the foregoing method embodiments. The memory 1521 and the processor 1522 may serve one or more boards. In other words, a memory and a processor may be independently disposed on each board, or a plurality of boards may share a same memory and a same processor. In addition, a necessary circuit may be further disposed on each board.

An embodiment of this application further provides a computer-readable storage medium, including instructions. When the instructions are run on a computer, the computer is enabled to perform the method performed by the access network device in either of the embodiments in FIG. 2 and FIG. 3.

An embodiment of this application further provides a computer-readable storage medium, including instructions. When the instructions are run on a computer, the computer is enabled to perform the method performed by the terminal in either of the embodiments in FIG. 2 and FIG. 3.

An embodiment of this application further provides a computer program product, including instructions. When the instructions are run on a computer, the computer is enabled to perform the method performed by the access network device in either of the embodiments in FIG. 2 and FIG. 3.

An embodiment of this application further provides a computer program product, including instructions. When the instructions are run on a computer, the computer is enabled to perform the method performed by the terminal in either of the embodiments in FIG. 2 and FIG. 3.

An embodiment of this application provides a chip system. The chip system includes a processor, may further include a memory, and is configured to implement functions of the access network device in the foregoing method. The chip system may include a chip, or may include a chip and another discrete component.

An embodiment of this application provides a chip system. The chip system includes a processor, may further include a memory, and is configured to implement functions of the terminal in the foregoing method. The chip system may include a chip, or may include a chip and another discrete component.

An embodiment of this application provides a system. The system includes the foregoing access network device and the foregoing terminal.

All or some of the methods provided in the embodiments of this application may be implemented by using software, hardware, firmware, or any combination thereof. When software is used to implement the methods, the methods may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, a network device, user equipment, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims of this application and their equivalent technologies.

What is claimed is:

1. A method comprising:
   sending, by a network device, first indication information to a plurality of terminals, wherein the first indication information includes a one-bit field or a two-bit field that indicates whether a paging message to be sent is intended for a terminal in a radio resource control idle (RRC_IDLE) state or a terminal in a radio resource control inactive (RRC_INACTIVE) state, and the paging message is used to page at least one terminal of the plurality of terminals; and
   sending, by the network device, the paging message,
   wherein the one-bit field or the two-bit field excludes information indicating any serving area for the terminal in the RRC_IDLE state or the terminal in the RRC INACTIVE state,
   wherein the first indication information is carried in a first downlink control information (DCI) message, the first DCI message further includes scheduling information, and
   wherein the one-bit field or the two-bit field indicates that the paging message to be sent is intended for the terminal in the RRC INACTIVE state such that the terminal in the RRC_IDLE state does not receive the paging message.

2. The method according to claim 1, wherein the first indication information comprises at least one of following information:
   whether the terminal in the RRC_IDLE state is to receive the paging message;
   the paging message is initiated by a core network;
   the paging message is initiated by a radio access network; or
   the paging message is initiated by the core network and the radio access network.

3. The method according to claim 1, wherein the first indication information is carried in a first message, and the first message is paging control information.

4. The method according to claim 1, wherein the paging message comprises identifiers of terminals, the identifiers comprise at least one first identifier and at least one second identifier, the at least one first identifier comprises a first identifier of a first terminal in the RRC_IDLE state, the at least one second identifier comprises a second identifier of a second terminal in the RRC_INACTIVE state, and the at least one first identifier and the at least one second identifier are arranged according to a preset rule.

5. The method according to claim 4, wherein the preset rule comprises one of following rules:

the identifiers are listed in one list, and each of the at least one first identifier is listed before any one of the at least one second identifier;

the identifiers are listed in one list, and each of the at least one second identifier is listed before any one of the at least one first identifier; or the identifiers are classified into two lists, a first list in the two lists comprises the at least one first identifier, and a second list in the two lists comprises the at least one second identifier.

6. The method according to claim 4, wherein the method further comprises:

sending, by the network device, second indication information, wherein the second indication information indicates the preset rule.

7. A method comprising:

receiving, by an apparatus, first indication information, wherein the first indication information includes a one-bit field or a two-bit field that indicates whether a paging message to be sent is intended for a terminal in a radio resource control idle (RRC_IDLE) state or a terminal in a radio resource control inactive (RRC_INACTIVE) state, and the paging message is used to page at least one terminal of a plurality of terminals; and monitoring, by the apparatus, the paging message when determining, by the apparatus based on the first indication information, to receive the paging message, wherein the one-bit field or the two-bit field excludes information indicating any serving area for the terminal in the RRC_IDLE state or the terminal in the RRC INACTIVE state, wherein the first indication information is carried in a first downlink control information (DCI) message, the first DCI message further includes scheduling information, and wherein the one-bit field or the two-bit field indicates that the paging message to be sent is intended for the terminal in the RRC INACTIVE state such that the terminal in the RRC_IDLE state does not receive the paging message.

8. The method according to claim 7, wherein the first indication information comprises at least one of following information:

whether the terminal in the RRC_IDLE state is to receive the paging message;

the paging message is initiated by a core network;

the paging message is initiated by a radio access network; or the paging message is initiated by the core network and the radio access network.

9. The method according to claim 7, wherein the first indication information is carried in a first message, and the first message is paging control information.

10. The method according to claim 7, wherein the paging message comprises identifiers of terminals, the identifiers comprise at least one first identifier and at least one second identifier, the at least one first identifier comprises a first identifier of a first terminal in the RRC_IDLE state, the at least one second identifier comprises a second identifier of a second terminal in the RRC_INACTIVE state, and the at least one first identifier and the at least one second identifier are arranged according to a preset rule.

11. The method according to claim 10, wherein the preset rule comprises one of following rules:

the identifiers are listed in one list, and each of the at least one first identifier is listed before any one of the at least one second identifier;

the identifiers are listed in one list, and each of the at least one second identifier is listed before any one of the at least one first identifier; or the identifiers are classified into two lists, a first list in the two lists comprises the at least one first identifier, and a second list in the two lists comprises the at least one second identifier.

12. The method according to claim 11, wherein the method further comprises:

receiving, by the apparatus, second indication information, wherein the second indication information indicates the preset rule.

13. The method according to claim 12, wherein the second indication information comprises at least one of following information:

an offset between a $1^{st}$ second identifier and a $1^{st}$ first identifier in the one list;

a first mapping relationship between the first list in the two lists and the at least one first identifier; or a second mapping relationship between the second list in the two lists and the at least one second identifier.

14. An apparatus, comprising at least one processor and a transceiver, wherein the transceiver is configured to receive first indication information under control of the at least one processor, wherein the first indication information includes a one-bit field or a two-bit field that indicates whether a paging message to be sent is intended for a terminal in a radio resource control idle (RRC_IDLE) state or a terminal in a radio resource control inactive (RRC_INACTIVE) state, and the paging message is used to page at least one terminal of a plurality of terminals; and the at least one processor is configured to control the transceiver to monitor the paging message when the at least one processor determines, based on the first indication information, to receive the paging message, wherein the one-bit field or the two-bit field excludes information indicating any serving area for the terminal in the RRC_IDLE state or the terminal in the RRC_INACTIVE state, wherein the first indication information is carried in a first downlink control information (DCI) message, the first DCI message further includes scheduling information, and wherein the one-bit field or the two-bit field indicates that the paging message to be sent is intended for the terminal in the RRC INACTIVE state such that the terminal in the RRC_IDLE state does not receive the paging message.

15. The apparatus according to claim 14, wherein the first indication information comprises at least one of following information:

whether the terminal in the RRC_IDLE state is to receive the paging message;

the paging message is initiated by a core network;

the paging message is initiated by a radio access network; or the paging message is initiated by the core network and the radio access network.

16. The apparatus according to claim 14, wherein the first indication information is carried in a first message, and the first message is paging control information.

17. The apparatus according to claim 14, wherein the paging message comprises identifiers of terminals, the identifiers comprise at least one first identifier and at least one second identifier, the at least one first identifier comprises a first identifier of a first terminal in the RRC_IDLE state, the at least one second identifier comprises a second identifier of a second terminal in the RRC_INACTIVE state, and the at least one first identifier and the at least one second identifier are arranged according to a preset rule.

18. The apparatus according to claim 17, wherein the preset rule comprises one of following rules:

the identifiers are listed in one list, and each of the at least one first identifier is listed before any one of the at least one second identifier;

the identifiers are listed in one list, and each of the at least one second identifier is listed before any one of the at least one first identifier; or the identifiers are classified into two lists, a first list in the two lists comprises the at least one first identifier, and a second list in the two lists comprises the at least one second identifier.

19. The apparatus according to claim 18, wherein the transceiver is further configured to:

receive second indication information under the control of the at least one processor, wherein the second indication information indicates the preset rule.

20. The apparatus according to claim 19, wherein the second indication information comprises at least one of following information:

an offset between a $1^{st}$ second identifier and a $1^{st}$ first identifier in the one list;

a first mapping relationship between the first list in the two lists and the at least one first identifier; or a second mapping relationship between the second list in the two lists and the at least one second identifier.

* * * * *

UNITED STATES PATENT AND TRADEMARK OFFICE
CERTIFICATE OF CORRECTION

PATENT NO. : 12,127,160 B2
APPLICATION NO. : 17/351752
DATED : October 22, 2024
INVENTOR(S) : He et al.

Page 1 of 1

It is certified that error appears in the above-identified patent and that said Letters Patent is hereby corrected as shown below:

In the Claims

In Column 36, in Claim 1, Lines 33-34, delete "RRC INACTIVE" and insert -- RRC_INACTIVE --.

In Column 36, in Claim 1, Line 41, delete "RRC INACTIVE" and insert -- RRC_INACTIVE --.

In Column 37, in Claim 7, Lines 32-33, delete "RRC INACTIVE" and insert -- RRC_INACTIVE --.

In Column 37, in Claim 7, Line 41, delete "RRC INACTIVE" and insert -- RRC_INACTIVE --.

In Column 38, in Claim 14, Line 52, delete "RRC INACTIVE" and insert -- RRC_INACTIVE --.

Signed and Sealed this
Twenty-sixth Day of November, 2024

Katherine Kelly Vidal
*Director of the United States Patent and Trademark Office*